US012684146B2

(12) United States Patent
Kalva et al.

(10) Patent No.: US 12,684,146 B2
(45) Date of Patent: Jul. 14, 2026

(54) SYSTEMS AND METHODS FOR CODING AND DECODING IMAGE DATA USING GENERAL ADVERSARIAL MODELS

(71) Applicant: OP Solutions LLC, Amherst, MA (US)

(72) Inventors: Hari Kalva, Boca Raton, FL (US); Borivoje Furht, Boca Raton, FL (US); Velibor Adzic, Canton, GA (US)

(73) Assignee: OP Solutions LLC, Amherst, MA (US)

( * ) Notice: Subject to any disclaimer, the term of this patent is extended or adjusted under 35 U.S.C. 154(b) by 0 days.

(21) Appl. No.: 18/825,877

(22) Filed: Sep. 5, 2024

(65) Prior Publication Data

US 2024/0430464 A1    Dec. 26, 2024

Related U.S. Application Data

(63) Continuation of application No. PCT/US2023/014769, filed on Mar. 8, 2023.

(60) Provisional application No. 63/317,590, filed on Mar. 8, 2022.

(51) Int. Cl.
*H04N 19/42* (2014.01)
*H04N 19/70* (2014.01)

(52) U.S. Cl.
CPC ............. *H04N 19/42* (2014.11); *H04N 19/70* (2014.11)

(58) Field of Classification Search
None
See application file for complete search history.

(56) References Cited

U.S. PATENT DOCUMENTS

2017/0005925 A1* 1/2017 Yang ........................ H04L 45/74
2018/0174052 A1* 6/2018 Rippel ................. G06V 40/172
2021/0076016 A1* 3/2021 Sviridenko .............. G06N 3/08

* cited by examiner

*Primary Examiner* — Christopher Braniff
(74) *Attorney, Agent, or Firm* — OP Solutions IP Department; Paul D. Ackerman

(57) ABSTRACT

A video encoder and decoder system employing a compression-decision generative adversarial model ("CDGAM") has an encoder with a compression network and a decoder with a task network. The compression network is a generator portion of a pretrained CDGAM and the task network is a discriminator portion of the pretrained CDGAM. The compression network and task network are trained using common image data wherein the compression network is trained to a generate minimal compressed representation that results in a substantially similar loss as the original image at the discriminator.

6 Claims, 19 Drawing Sheets

Bitstream stream-level header — 505

Figure 5:
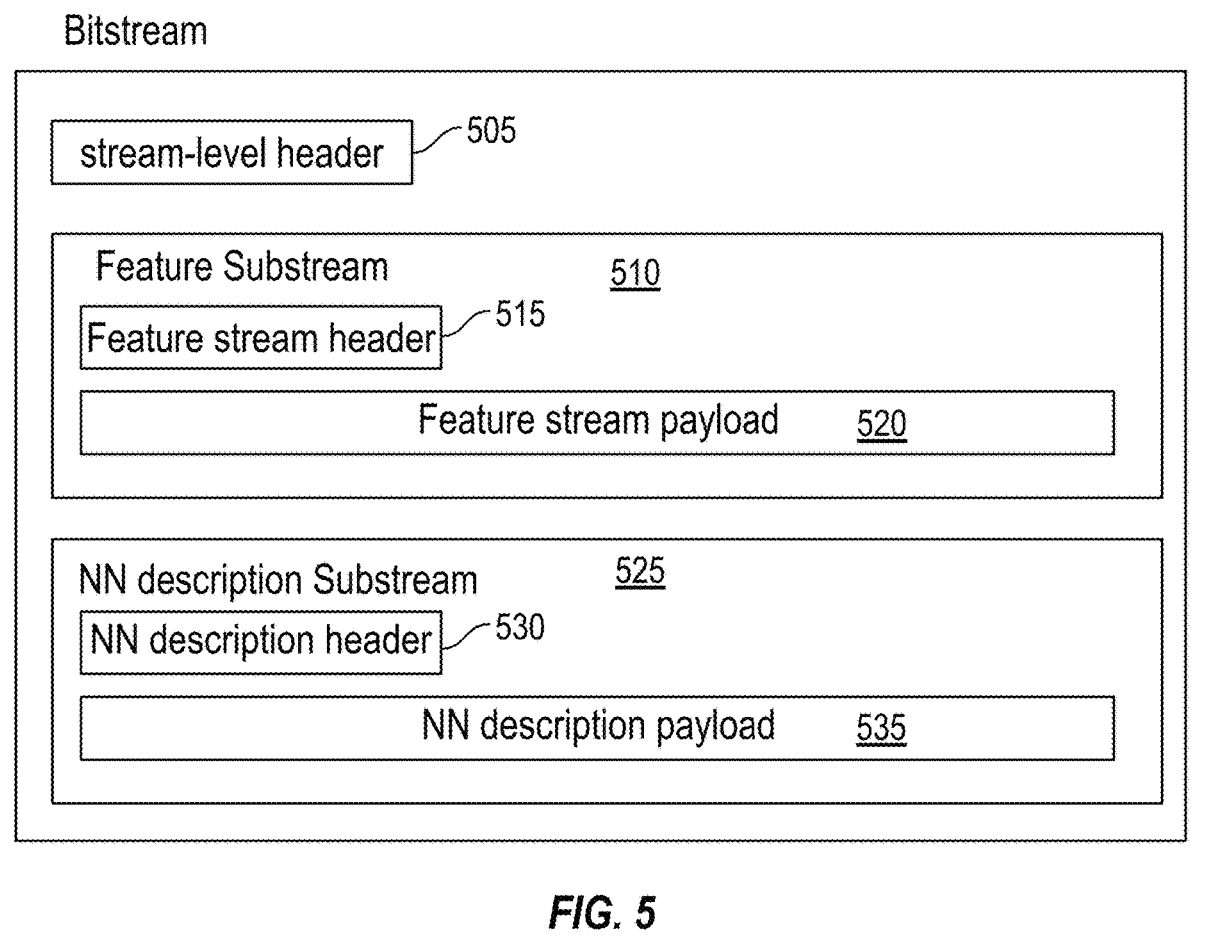

Feature Substream     510

Feature stream header — 515

Feature stream payload     520

NN description Substream     525

NN description header — 530

NN description payload     535

SYSTEMS AND METHODS FOR CODING AND DECODING IMAGE DATA USING GENERAL ADVERSARIAL MODELS

CROSS REFERENCE TO RELATED APPLICATIONS

This application is a continuation of international application PCT/US2023/014769 filed on Mar. 8, 2023 and titled SYSTEMS AND METHODS FOR CODING AND DECODING IMAGE DATA USING GENERAL ADVERSARIAL MODELS, which application claims the benefit of priority to U.S. Provisional Application 63/317,590 filed on Mar. 8, 2022, and titled Systems and Methods for Generative Adversarial Models for Image and Video Compression, the entirety of which is hereby incorporated by reference in its entirety.

FIELD OF THE INVENTION

The present invention generally relates to the field of video encoding and decoding, and more particularly relates to systems and methods for encoding and decoding image data using general adversarial models.

BACKGROUND

A video codec can include an electronic circuit or software that compresses or decompresses digital video. It can convert uncompressed video to a compressed format or vice versa. In the context of video compression, a device that compresses video (and/or performs some function thereof) can typically be called an encoder, and a device that decompresses video (and/or performs some function thereof) can be called a decoder.

A format of the compressed data can conform to a standard video compression specification. The compression can be lossy in that the compressed video lacks some information present in the original video. A consequence of this can include that decompressed video can have lower quality than the original uncompressed video because there is insufficient information to accurately reconstruct the original video.

There can be complex relationships between the video quality, the amount of data used to represent the video (e.g., determined by the bit rate), the complexity of the encoding and decoding algorithms, sensitivity to data losses and errors, ease of editing, random access, end-to-end delay (e.g., latency), and the like.

Motion compensation can include an approach to predict a video frame or a portion thereof given a reference frame, such as previous and/or future frames, by accounting for motion of the camera and/or objects in the video. It can be employed in the encoding and decoding of video data for video compression, for example in the encoding and decoding using the Motion Picture Experts Group (MPEG)'s advanced video coding (AVC) standard (also referred to as H.264). Motion compensation can describe a picture in terms of the transformation of a reference picture to the current picture. The reference picture can be previous in time when compared to the current picture, from the future when compared to the current picture. When images can be accurately synthesized from previously transmitted and/or stored images, compression efficiency can be improved.

While video content is often considered for human consumption, there is a growing need for video in industrial settings and other settings in which the contend is evaluated by machines rather than humans.

Recent trends in robotics, surveillance, monitoring, Internet of Things, etc. have introduced use cases in which significant portion of all the images and videos that are recorded in the field is consumed by machines only, without ever reaching human eyes. Those machines process images and videos with the goal of completing tasks such as object detection, object tracking, segmentation, event detection etc. Recognizing that this trend is prevalent and will only accelerate in the future, international standardization bodies established efforts to standardize image and video coding that is primarily optimized for machine consumption. For example, standards like JPEG AI and Video Coding for Machines are initiated in addition to already established standards such as Compact Descriptors for Visual Search, and Compact Descriptors for Video Analytics. Further improving encoding and decoding of video for consumption by machines and in hybrid systems in which video is consumed by both a human viewer and a machine is, therefore, of growing importance in the field.

In many applications, such as surveillance systems with multiple cameras, intelligent transportation, smart city applications, and/or intelligent industry applications, traditional video coding may require compression of large number of videos from cameras and transmission through a network for both machine consumption and for human consumption. Subsequently, at a machine site, algorithms for feature extraction may applied typically using convolutional neural networks or deep learning techniques including object detection, event action recognition, pose estimation and others.

SUMMARY OF THE DISCLOSURE

This disclosure generally describes a framework for the image and video compression that can be used in systems where the end-user is either a machine or a human observer, or both, such as Video Coding for Machines (VCM), Internet-of-things (IoT), and similar. The framework incorporates a generative adversarial model (GAM), which is trained beforehand and distributed to the encoder and the decoder sides of the system. The encoder implements a neural network that compresses the input image/video and which is trained as a generator. The decoder implements a neural network that uses compressed image/video as an input and outputs a task-dependent decision, and that is trained as a discriminator. The encoder and the decoder can be updated at any time by sending messages between each other or receiving messages from a third party.

Encoded images/videos and the model updates are preferably communicated between the encoder and the decoder using a bitstream. The proposed framework can support systems for a hybrid use cases where the end users are either machines, or humans, or both.

In one embodiment, a video encoder is provided which preferably includes a preprocessor receiving an input video signal to be encoded. A compression network is coupled to the preprocessor. The compression network is a pretrained generator portion of a compression-decision generative adversarial model ("CDGAM"). A network update encoder is operatively coupled to the compression network and generates a network update substream. A video encoder is also coupled to the compression network and generates an encoded image substream. A multiplexer receives the network update substream and encoded image substream and generates a unified encoded bitstream.

Preferably, the compression network is trained with a discriminator portion of the CDGAM which provides a generator loss function that is backpropagated to the generator. The compression network can be trained to compress the input image to the minimal compressed representation that results in same or similar loss as the original image at the discriminator. In certain embodiments, the compression network can be trained with a loss function:

$$L_{CD} = E_x[\log D(x)] + E_x[\log(1 - D(C(x)))]$$

where C(x) is the output of the compression network and D(x) is the output of the discriminator.

The unified encoded bitstream preferably includes a stream level header, a video substream having a video substream header and a video substream payload, and a network update substream having a network update substream header and a network update payload.

Embodiments of video decoders are also provided. A decoder may include a demultiplexer receiving an input bitstream and parsing the bitstream into at least one of a network update substream and a video substream. A network update decoder is coupled to the demultiplexer and receives the network update substream therefrom. The decoder further includes a video decoder coupled to the demultiplexer and receiving the video substream therefrom. A task network is coupled to the network update decoder and video decoder and receives the network update substream and video substream. The task network is a pretrained discriminator portion from a compression-decision generative adversarial model, where the generator portion was used in the encoder to generate the received bitstream.

The task network can be trained with image data and a generator portion which provides compressed image data. During training, the task network outputs a discriminator loss function that is backpropagated to the task network to train the discriminator.

The task network is also used to pretrain a compression network to compress the input image to the minimal compressed representation that results in same or similar loss as the original image at the discriminator.

The task network in the decoder can be trained with a loss function:

$$L_{CD} = E_x[\log D(x)] + E_x[\log(1 - D(C(x)))]$$

where C(x) is the output of the compression network and D(x) is the output of the discriminator.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIG. 5 is a block diagram of an exemplary embodiment of a bitstream structure;

FIG. 8 is a schematic diagram illustrating two exemplary embodiments of NNB-NNH split points;

The drawings are not necessarily to scale and may be illustrated by phantom lines, diagrammatic representations, and fragmentary views. In certain instances, details that are not necessary for an understanding of the embodiments or that render other details difficult to perceive may have been omitted.

DETAILED DESCRIPTION

Figure 1:
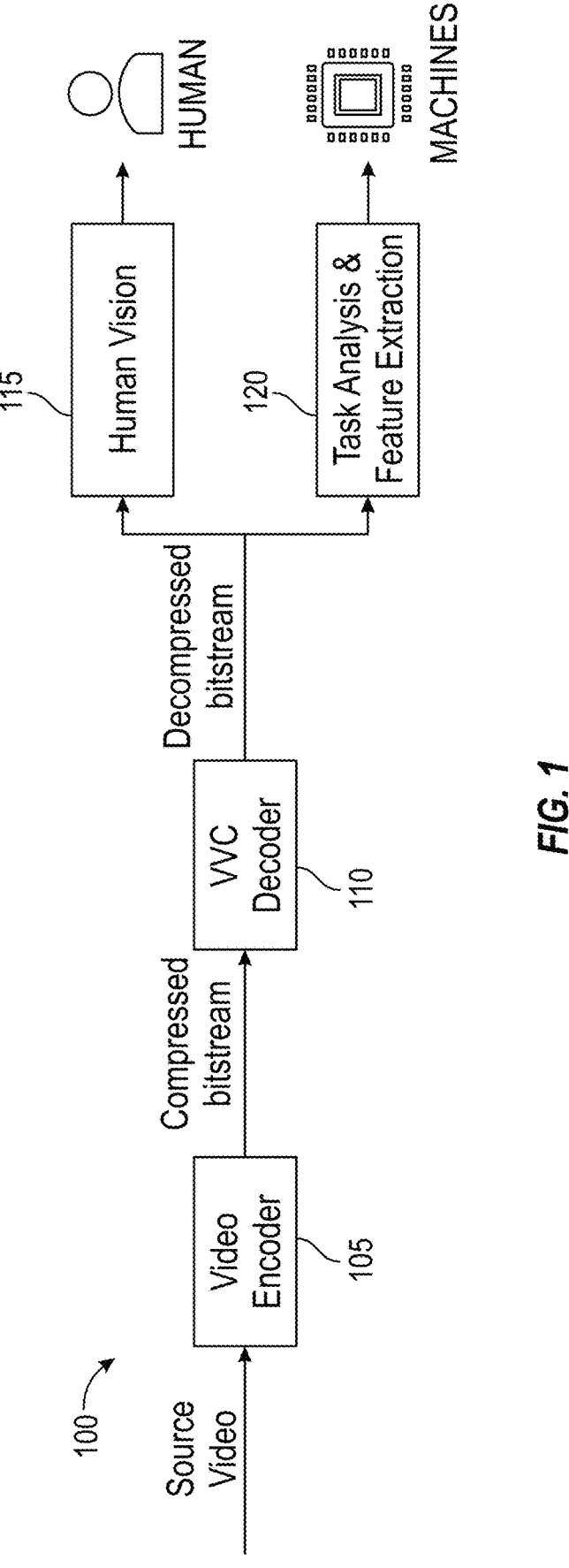
FIG. 1 is a block diagram illustrating an exemplary embodiment of a video coding system.

FIG. 1 shows an exemplary embodiment of a coding/decoding system which includes a channel applied for machines. Such a system is generally compliant with one or more video compression standards such as HEVC, AV1, VVC and the like. Conventional approaches unfortunately, may require a massive video transmission from multiple cameras, which may take significant time for efficient and fast real-time analysis and decision-making. In certain embodiments, a video coding for machines (VCM) approach may resolve this problem by both encoding video and extracting some features at a transmitter site and then transmitting a resultant encoded bit stream to a VCM decoder. At a decoder site, video may be decoded for human vision and features may be decoded for machines. As used herein, the term VCM refers broadly to video coding and decoding for machine consumption and while the disclosed systems and methods may be standard compliant, the disclosure is not limited to a specific proposed protocol or standard.

A "feature," as used in this disclosure, is a specific structural and/or content attribute of data. Examples of features may include SIFT, audio features, color hist, motion hist, speech level, loudness level, or the like. Features may be time stamped. Each feature may be associated with a single frame of a group of frames. Features may include high level content features such as timestamps, labels for persons and objects in the video, coordinates for objects and/or regions-of-interest, frame masks for region-based quantization, and/or any other feature that may occur to persons skilled in the art upon reviewing the entirety of this disclosure. As a further non-limiting example, features may include features that describe spatial and/or temporal characteristics of a frame or group of frames. Examples of features that describe spatial and/or temporal characteristics may include motion, texture, color, brightness, edge count, blur, blockiness, or the like. When in offline mode, all machine models as described in further detail below may be stored at encoder and/or in memory of and/or accessible to encoder. Examples of such models may include, without limitation, whole or partial convolutional neural networks, keypoint extractors, edge detectors, salience map constructors, or the like. When in online mode one or more models may be communicated to feature extractor 220 by a remote machine in real time or at some point before extraction.

At a decoder site it will be appreciated that video may be decoded for human vision and features may be decoded for machines. Systems which provide video for both human vision and for machine consumption are sometimes referred to as hybrid systems. The systems and methods disclosed herein are intended to apply to machine-based systems as well as hybrid systems.

FIG. 1 is a high-level block diagram of a system for encoding and decoding video in a hybrid system which includes consumption of the video content by both human viewers and machine consumption. A source video is received by a video encoder 105 which provides a compressed bitstream for transmission over a channel to video decoder 110. The video encoder may encode the video for human consumption as well as encoding the video for machine consumption. The video decoder 110 provides complimentary processing on the compressed bitstream to extract the video for human vision 115 as well as task analysis and feature extraction 120 for machine consumption. Feature extraction can be classified as any computer vision task, such as edge detection, line detection, object detection, or more recent techniques such as convolutional neural networks where the output of the feature extraction can be spatially mapped back onto the pixel space of the input video. Video coding can include any standard video encoder and/or encoding techniques such as, for example, Advanced Video Codec (AVC), Versatile Video Coding (VVC), or High Efficiency Video Coding (HEVC).

Figure 2:
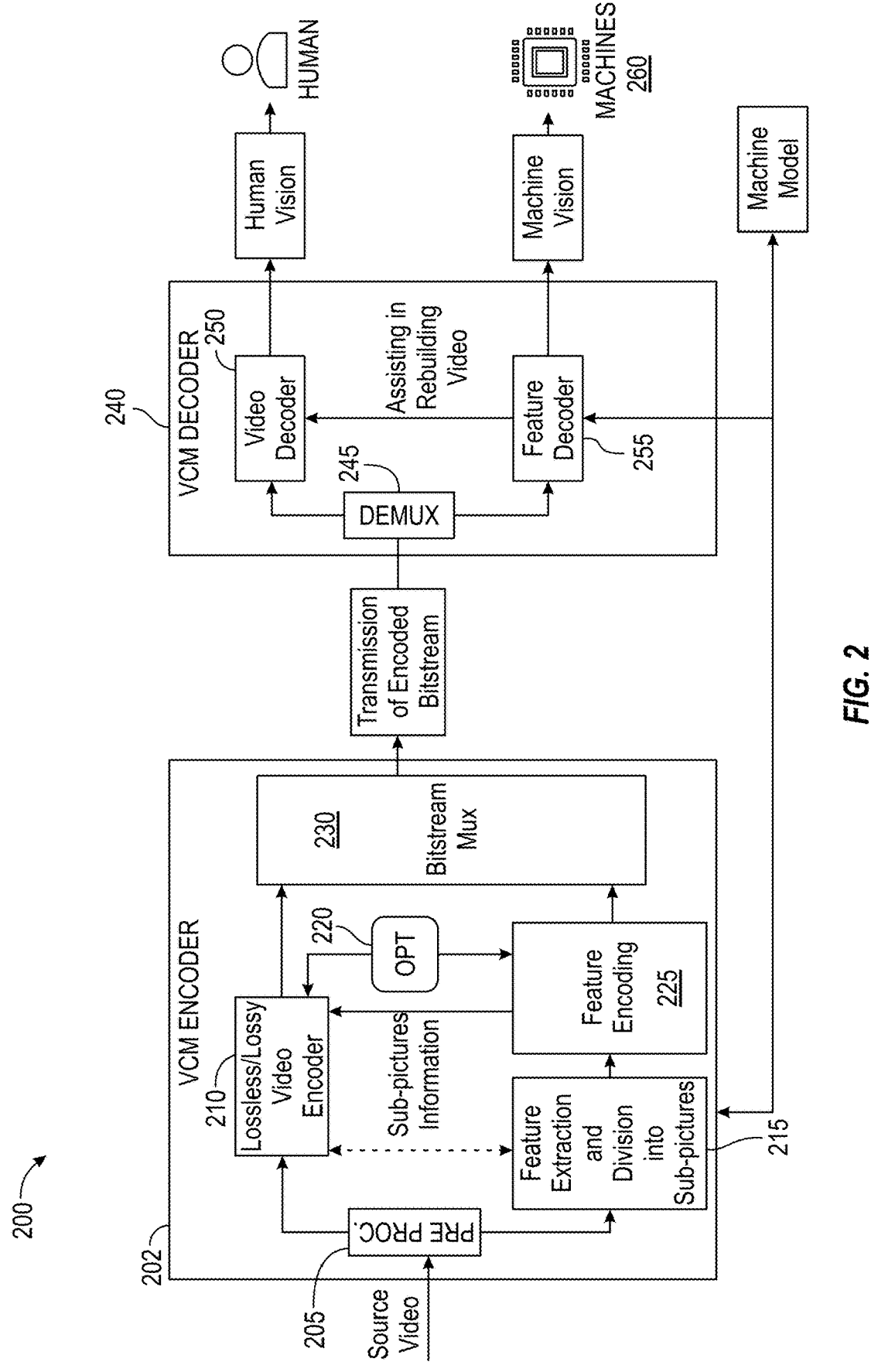
FIG. 2 is a block diagram illustrating an exemplary embodiment of a video coding for machines system.

Referring now to FIG. 2, an exemplary embodiment of encoder for video coding for machines (VCM) is illustrated. VCM encoder 202 may be implemented using any circuitry including without limitation digital and/or analog circuitry; VCM encoder 202 may be configured using hardware configuration, software configuration, firmware configuration, and/or any combination thereof. VCM encoder 202 may be implemented as a computing device and/or as a component of a computing device, which may include without limitation any computing device as described below. In an embodiment, VCM encoder 202 may be configured to receive an input video 204 and generate an output bitstream 208. Reception of an input video 204 may be accomplished in any manner described below. A bitstream may include, without limitation, any bitstream as described below.

VCM encoder 202 may include, without limitation, a pre-processor 206, a video encoder 210, a feature extractor 215, an optimizer 220, a feature encoder 225, and/or a multiplexor 230. Pre-processor 206 may receive input video 204 stream and parse out video, audio and metadata substreams of the stream. Pre-processor 206 may include and/or communicate with decoder as described in further detail below; in other words, Pre-processor 206 may have an ability to decode input streams. This may allow, in a non-limiting example, decoding of an input video 204, which may facilitate downstream pixel-domain analysis.

Further referring to FIG. 2, VCM encoder 202 may operate in a hybrid mode and/or in a video mode; when in the hybrid mode VCM encoder 200 may be configured to encode a visual signal that is intended for human consumers, to encode a feature signal that is intended for machine consumers; machine consumers may include, without limitation, any devices and/or components, including without limitation computing devices as described in further detail below. Input signal may be passed, for instance when in hybrid mode, through pre-processor 206.

Still referring to FIG. 2, video encoder 210 may include without limitation any video encoder 210 as described in further detail below. When VCM encoder 202 is in hybrid mode, VCM encoder 202 may send unmodified input video 204 to video encoder 210 and a copy of the same input video 204, and/or input video 204 that has been modified in some way, to feature extractor 215. Modifications to input video 204 may include any scaling, transforming, or other modification that may occur to persons skilled in the art upon reviewing the entirety of this disclosure. For instance, and without limitation, input video 204 may be resized to a smaller resolution, a certain number of pictures in a sequence of pictures in input video 204 may be discarded, reducing framerate of the input video 204, color information may be modified, for example and without limitation by converting an RGB video might be converted to a grayscale video, or the like.

Still referring to FIG. 2, video encoder 210 and feature extractor 215 are connected and might exchange useful information in both directions. For example, and without limitation, video encoder 210 may transfer motion estimation information to feature extractor 220, and vice-versa. Video encoder 210 may provide Quantization mapping and/or data descriptive thereof based on regions of interest (ROI), which video encoder 210 and/or feature extractor 215 may identify, to feature extractor 215, or vice-versa. Video encoder 210 may provide to feature extractor 215 data describing one or more partitioning decisions based on features present and/or identified in input video 204, input signal, and/or any frame and/or subframe thereof; feature extractor 218 may provide to video encoder 210 data describing one or more partitioning decisions based on features present and/or identified in input video 204, input signal, and/or any frame and/or subframe thereof. Video encoder 210 feature extractor 215 may share and/or transmit to one another temporal information for optimal group of pictures (GOP) decisions. Each of these techniques and/or processes may be performed, without limitation, as described in further detail below.

With continued reference to FIG. 2, feature extractor 220 may operate in an offline mode or in an online mode. Feature extractor 220 may identify and/or otherwise act on and/or manipulate features. A "feature," as used in this disclosure, is a specific structural and/or content attribute of data. Examples of features may include SIFT, audio features, color hist, motion hist, speech level, loudness level, or the like. Features may be time stamped. Each feature may be associated with a single frame of a group of frames. Features may include high level content features such as timestamps, labels for persons and objects in the video, coordinates for objects and/or regions-of-interest, frame masks for region-based quantization, and/or any other feature that may occur to persons skilled in the art upon reviewing the entirety of this disclosure. As a further non-limiting example, features may include features that describe spatial and/or temporal characteristics of a frame or group of frames. Examples of features that describe spatial and/or temporal characteristics may include motion, texture, color, brightness, edge count, blur, blockiness, or the like. When in offline mode, all machine models as described in further detail below may be stored at encoder and/or in memory of and/or accessible to encoder. Examples of such models may include, without limitation, whole or partial convolutional neural networks, keypoint extractors, edge detectors, salience map constructors, or the like. When in online mode one or more models may be communicated to feature extractor 220 by a remote machine in real time or at some point before extraction.

Still referring to FIG. 2, feature encoder 225 is configured for encoding a feature signal, for instance and without limitation as generated by feature extractor 220. In an embodiment, after extracting the features feature extractor 220 may pass extracted features to feature encoder 225. Feature encoder 225 may use entropy coding and/or similar techniques, for instance and without limitation as described below, to produce a feature stream, which may be passed to multiplexor 230. Video encoder 210 and/or feature encoder 225 may be connected via optimizer 220; optimizer 220 may exchange useful information between the video encoder 210 and feature encoder 225. For example, and without limitation, information related to codeword construction and/or length for entropy coding may be exchanged and reused, via optimizer 220, for optimal compression.

In an embodiment, and continuing to refer to FIG. 2, video encoder 210 may produce a video stream; video stream may be passed to multiplexor 230. Multiplexor 230 may multiplex video stream with a feature stream generated by feature encoder 225; alternatively or additionally, video and feature bitstreams may be transmitted over distinct channels, distinct networks, to distinct devices, and/or at distinct times or time intervals (time multiplexing). Each of video stream and feature stream may be implemented in any manner suitable for implementation of any bitstream as described in this disclosure. In an embodiment, multiplexed video stream and feature stream may produce a hybrid bitstream, which may be is transmitted as described in further detail below.

Still referring to FIG. 2, where VCM encoder 200 is in video mode, VCM encoder 200 may use video encoder 210 for both video and feature encoding. Feature extractor 220 may transmit features to video encoder 210; the video encoder 210 may encode features into a video stream that may be decoded by a corresponding video decoder 250. It should be noted that VCM encoder 200 may use a single video encoder 210 for both video encoding and feature encoding, in which case it may use different set of parameters for video and features; alternatively, VCM encoder 200 may two separate video encoder 210s, which may operate in parallel.

Still referring to FIG. 2, system 200 may include and/or communicate with, a VCM decoder 240. VCM decoder 240 and/or elements thereof may be implemented using any circuitry and/or type of configuration suitable for configuration of VCM encoder 200 as described above. VCM decoder 240 may include, without limitation, a demultiplexer 245. Demultiplexer 245 may operate to demultiplex bitstreams if multiplexed as described above. For instance and without limitation, demultiplexer 245 may separate a multiplexed bitstream containing one or more video bitstreams and one or more feature bitstreams into separate video and feature bitstreams.

Continuing to refer to FIG. 2, VCM decoder 240 may include a video decoder 250. Video decoder 250 may be implemented, without limitation in any manner suitable for a decoder as described in further detail below. In an embodiment, and without limitation, video decoder 250 may generate an output video, which may be viewed by a human or other creature and/or device having visual sensory abilities.

Still referring to FIG. 2, VCM decoder 240 may include a feature decoder 255. In an embodiment, and without limitation, feature decoder 255 may be configured to provide one or more decoded data to a machine. Machine may include, without limitation, any computing device as described below, including without limitation any microcontroller, processor, embedded system, system on a chip, network node, or the like. Machine may operate, store, train, receive input from, produce output for, and/or otherwise interact with a machine model as described in further detail below. Machine may be included in an Internet of Things (IOT), defined as a network of objects having processing and communication components, some of which may not be conventional computing devices such as desktop computers, laptop computers, and/or mobile devices. Objects in IoT may include, without limitation, any devices with an embedded microprocessor and/or microcontroller and one or more components for interfacing with a local area network (LAN) and/or wide-area network (WAN); one or more components may include, without limitation, a wireless transceiver, for instance communicating in the 2.4-2.485 GHz range, like BLUETOOTH transceivers following protocols as promulgated by Bluetooth SIG, Inc. of Kirkland, Wash, and/or network communication components operating according to the MODBUS protocol promulgated by Schneider Electric SE of Rueil-Malmaison, France and/or the ZIGBEE specification of the IEEE 802.15.4 standard promulgated by the Institute of Electronic and Electrical Engineers (IEEE). Persons skilled in the art, upon reviewing the entirety of this disclosure, will be aware of various alternative or additional communication protocols and devices supporting such protocols that may be employed consistently with this disclosure, each of which is contemplated as within the scope of this disclosure.

A machine model 265 may be included and integrated within the decoder 240 or as a stand-alone component separate from the decoder 240 at a remote location. The machine model is preferably coupled to both the feature decoder 255 in the decoder and feature extractor 215 in the encoder. Examples of such machine models may include, without limitation, whole or partial convolutional neural networks, keypoint extractors, edge detectors, salience map constructors, or the like.

With continued reference to FIG. 2, each of VCM encoder 202 and/or VCM decoder 240 may be designed and/or configured to perform any method, method step, or sequence of method steps in any embodiment described in this disclosure, in any order and with any degree of repetition. For instance, each of VCM encoder 202 and/or VCM decoder 240 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Each of VCM encoder 202 and/or VCM decoder 240 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

The present systems and methods are based on a machine learning architecture that supports multiple tasks for the end users. Most common machine learning architectures used today are neural networks. One of the shortcomings of simple, single-task neural networks is time complexity and computational cost of training. To achieve high performance, neural networks typically must be trained using very large datasets with hundreds of thousands and sometimes millions of samples such as images and videos. Training a separate network each time a new use case arises can be highly redundant and resource wasteful. Therefore, methods have been developed to reuse already trained portions of neural networks for multiple tasks. By training one part of the network to support multiple tasks, users can save storage space, computational power, and reduce energy consumption. In the context of a neural network, the backbone is the part of the network that comprises the majority of the layers and nodes and is largely responsible for the bulk of the computation. The head, on the other hand, is the part of the network that is responsible for making the final predictions or decisions based on the output of the backbone. As used herein, those parts of the neural networks that can be reused and don't change substantially for different tasks are called "neural network backbone" (backbone). The rest of the neural network(s) that is modified based on the target task is called "neural network head" (head).

Figure 3:
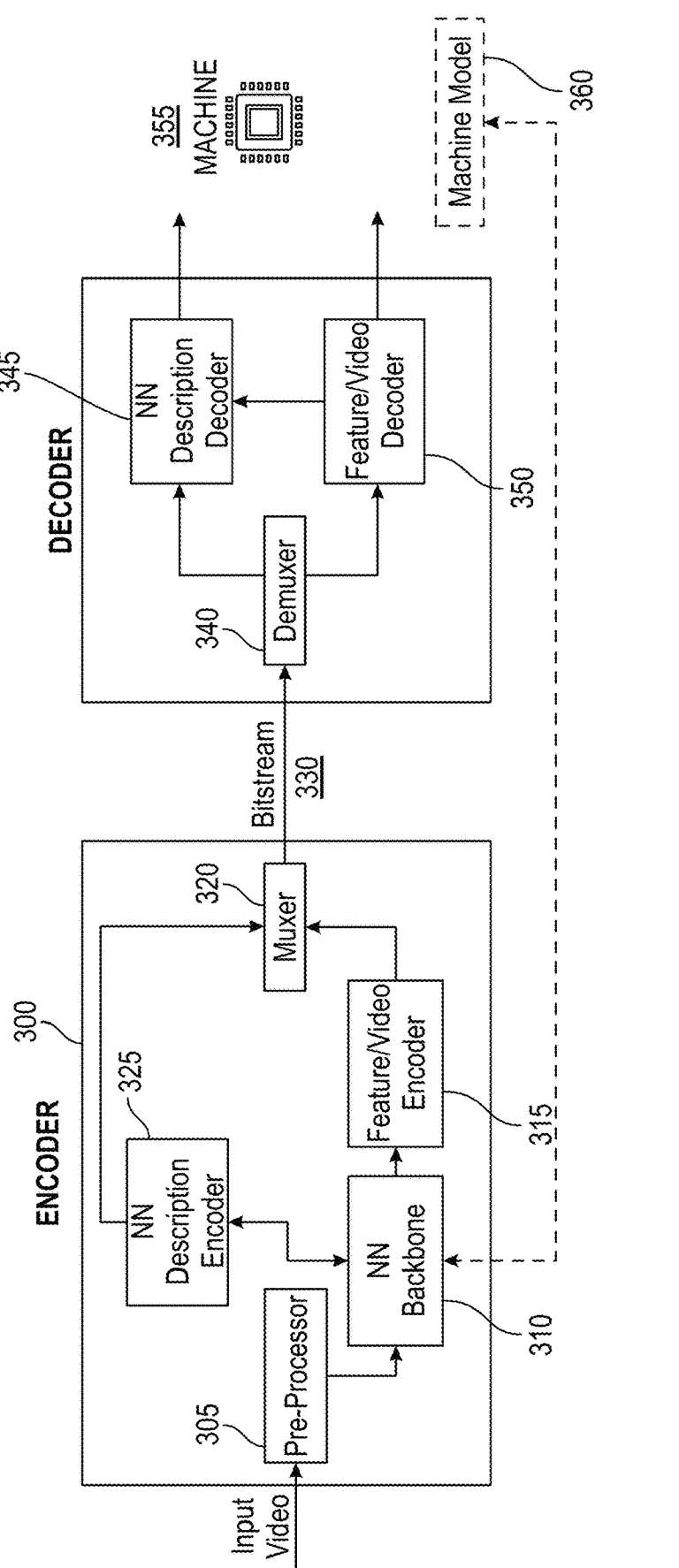
FIG. 3 is a block diagram illustrating an exemplary embodiment of a system for adaptive neural network optimization for multiple task feature coding.

FIG. 3 is a block diagram illustrating an exemplary embodiment of a system for adaptive neural network optimization for multiple task feature coding; system may be used in a method for adaptive neural network optimization that can be used for multiple task feature coding in systems that implement standards such as Video Coding for Machines (VCM), or any other system that is implementing neural networks for image and video processing by machines, such as Internet of Things (IoT).

Typically, an input image or video is passed through the encoder 300 that extracts the relevant features. The encoder 300 includes a preprocessor 305 that is coupled to a neural network backbone (neural network backbone) 310, the output of which is a set of features that can be further compressed using feature or video encoder 315. The neural network backbone 310 may also receive input and/or training data from a machine model 360. The output of video encoder 315 is a feature substream. In addition to the features, the description of the neural network backbone 310 can be compressed and a description substream may be combined in multiplexor 320 with the feature substream from a neural network description encoder 325 to form the bitstream 330.

Bitstream 330 is sent over a channel to a decoder 335 which decodes/decompresses the two substreams and produces the neural network backbone description as well as a feature set. The bitstream 330 is received by a demuxer 340 which parses the bitstream into an neural network backbone description substream applied to neural network description decoder 345 and a feature set substream which is applied to a feature/video decoder 350. End user (machine) 355 receives the feature set and passes it as an input to the neural network head (NNH), which at the output produces decisions related to the task or tasks that are conducted by the machine. This is possible in cases, for example, where the complete neural network (NN) is pre-trained and the parameters of the neural network backbone are known and not changed.

Figure 4:
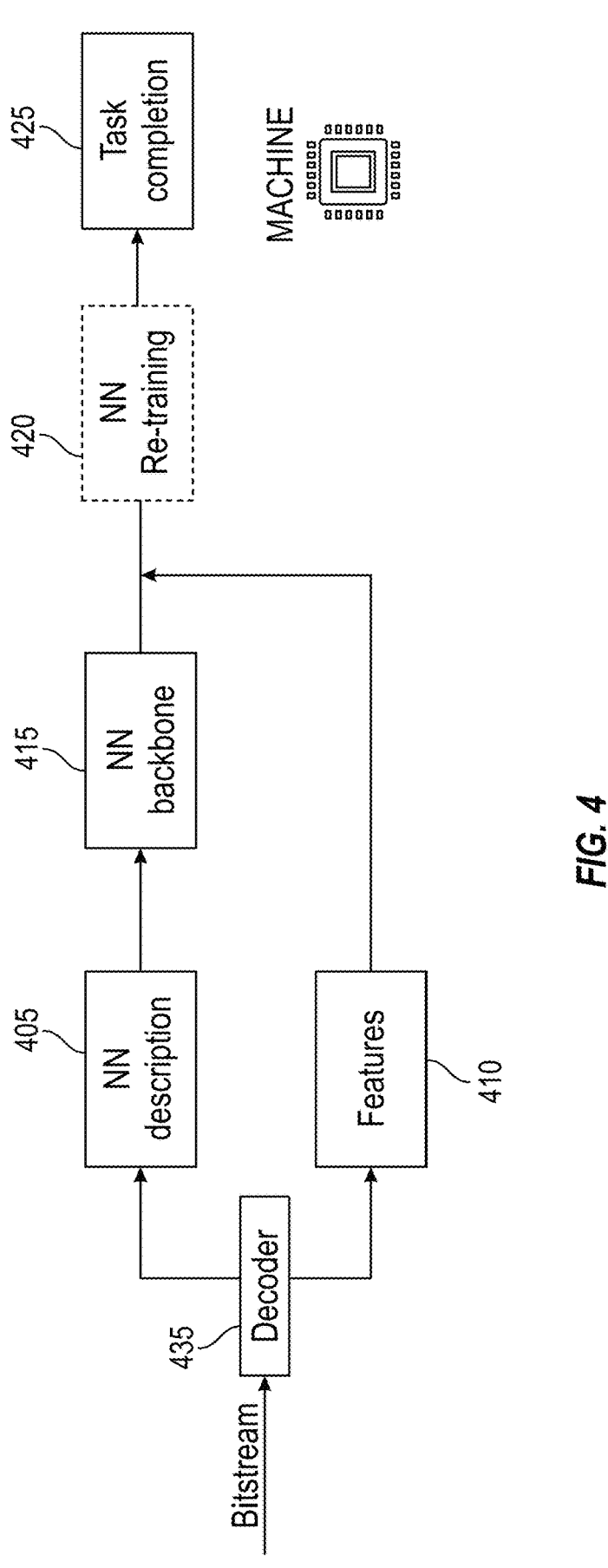
FIG. 4 is a block diagram illustrating an exemplary embodiment of a machine process with decoder outputs as inputs for the task completion.

FIG. 4 is a block diagram illustrating an exemplary embodiment of a machine process with the outputs of decoder 435 serving as inputs for the task completion process. In cases where the neural network backbone 415 is not trained by the machine and the parameters of neural network backbone 415 are not known, the machine receives the neural network backbone description 405 from the decoder 435 and reconstructs the complete neural network backbone 415, and optionally conducts fine tuning of the neural network head, either to align with the neural network backbone, or to support additional tasks that were not included in the original neural network backbone training. Here, neural network re-training (NNH fine tuning) is an optional step 420.

In cases where machine 355 knows the complete neural network, such as by knowing all neural network backbone parameters, the neural network backbone description does not need to be transmitted to the decoder. In such cases the bitstream may only contain the feature substream 410.

To facilitate flexibility on the encoder side, in cases when the tasks need to be changed, or the parameters of the current task need to be changed, the machine can send the neural network backbone description to the encoder side which aligns with the pertinent machine model.

On the encoder side, the feature/video encoder can be implemented using the existing video and feature standards such as Versatile Video Coding (VVC), High Efficiency Video Coding (HEVC), AOMedia Video 1 (AV1), Compact Descriptors for Video Analysis (CDVA), or similar.

The neural network description encoder can be implemented using simple techniques such as Variable Length Coding (VLC), or the more advanced standards such as Neural Network Compression and Representation (NNR), or similar.

FIG. 5 is a block diagram of an exemplary embodiment of a bitstream structure suitable for use with the present encoding and decoding systems. The bitstream includes a stream-level header 505 which contains high level syntax describing the presence of the substreams and contains parameters of such substreams, such as length, duration, format, etc. This information is used by the demuxer in the decoder to extract substreams.

The bitstream may further include a feature substream 510 which contains a feature stream header 515 which includes syntax elements to describe the feature stream payload 520 in terms of length, format, and other pertinent parameters. Feature stream header 515 can be used by the feature decoder to extract and decode the feature stream payload 520.

Neural network description substream 525 generally contains the neural network description header 530 which contains parameters describing the length, format, type of the neural network description, and the like. Alternatively, instead of the complete description of all neural network parameters, the encoder can signal the index of the used neural network in the look-up table or a list that is predetermined and agreed upon. This list can be maintained by a central registration authority which updates it and signals the updates to the end users, neural network description header is used by the feature decoder to extract and decode the neural network description payload.

Depending on the level of abstraction and cross-task generalization, the splitting point between the neural network head and neural network backbone can be adaptively selected. Also, when a neural network is trained for multiple tasks and use cases, parts of it can be mostly or fully related to concrete tasks, while other parts might be mostly or fully redundant for a concrete task. In the following paragraphs we are presenting two techniques for adaptive optimization: vertical optimization (task-specific ablation) and horizontal optimization (computational offloading).

Figure 6:
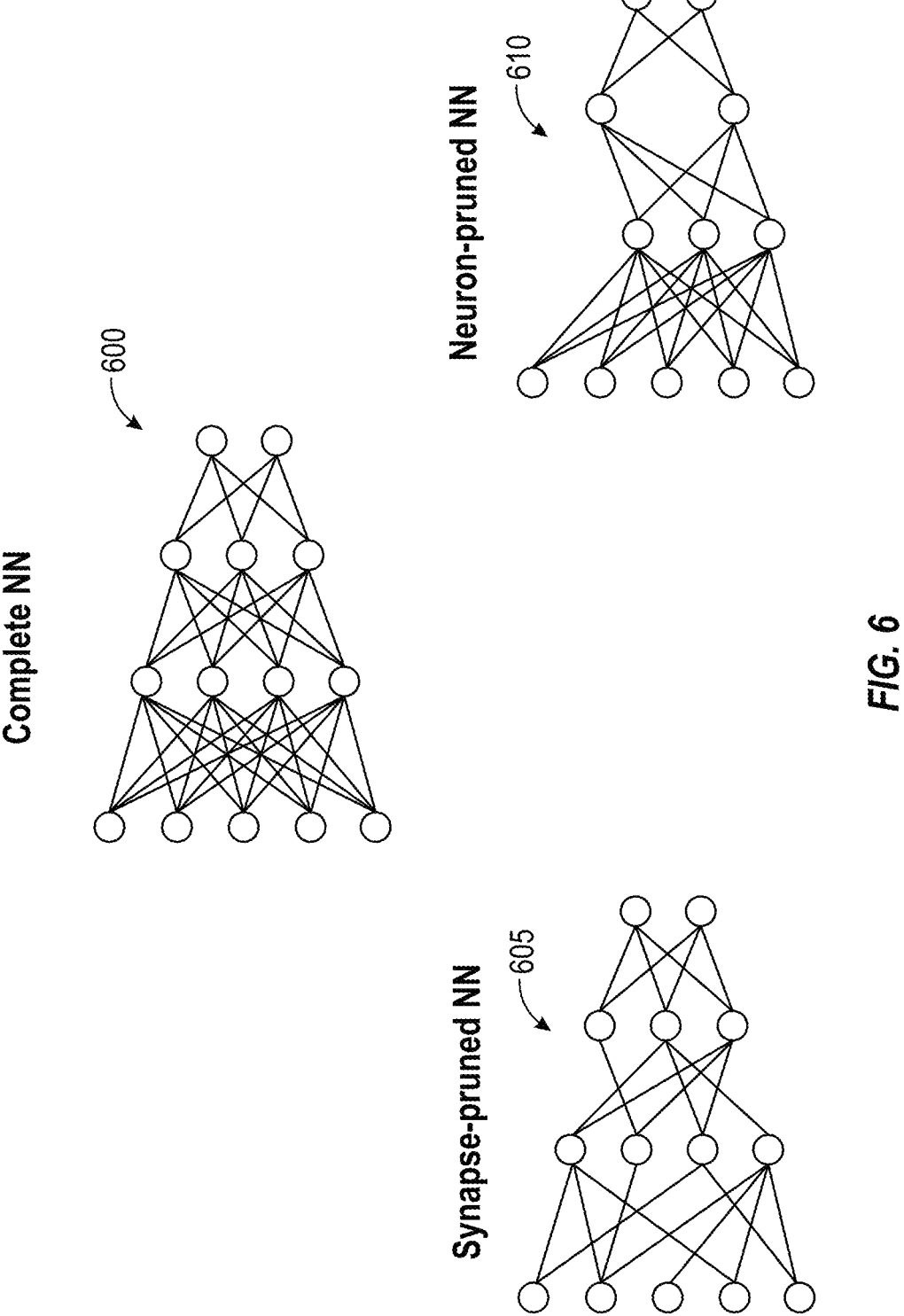
FIG. 6 is a schematic diagram illustrating exemplary embodiments of pruned neural networks.

FIG. 6 is a schematic diagram illustrating exemplary embodiments of pruned neural networks; such embodiments may implement vertical optimization and/or task-specific ablation. The technique of ablation or pruning has been well established in the machine learning literature with a specific focus on the neural networks The idea is that parts of the neural network can be removed when training for a specific task. By pruning neurons or connections (synapses), a single neural network 600 can be optimized to support multiple tasks. Examples of pruning are given in FIG. 6, which illustrate a complete neural network 600, a synapse pruned neural network 605 and a neuron pruned neural network 610. By removing unimportant weights from a network, several improvements can be expected: better generalization, fewer training examples required, and improved speed of learning and/or classification. The basic idea is to use second-derivative information to make a tradeoff between network complexity and training set error.

As an example, part of the neural network can be trained for object detection and another part for object tracking, or segmentation. On a lower level, part of the network can be trained for detecting one class of objects (ex. Persons), while another part can be trained for detecting another class of objects (ex. Cars).

Figure 7:
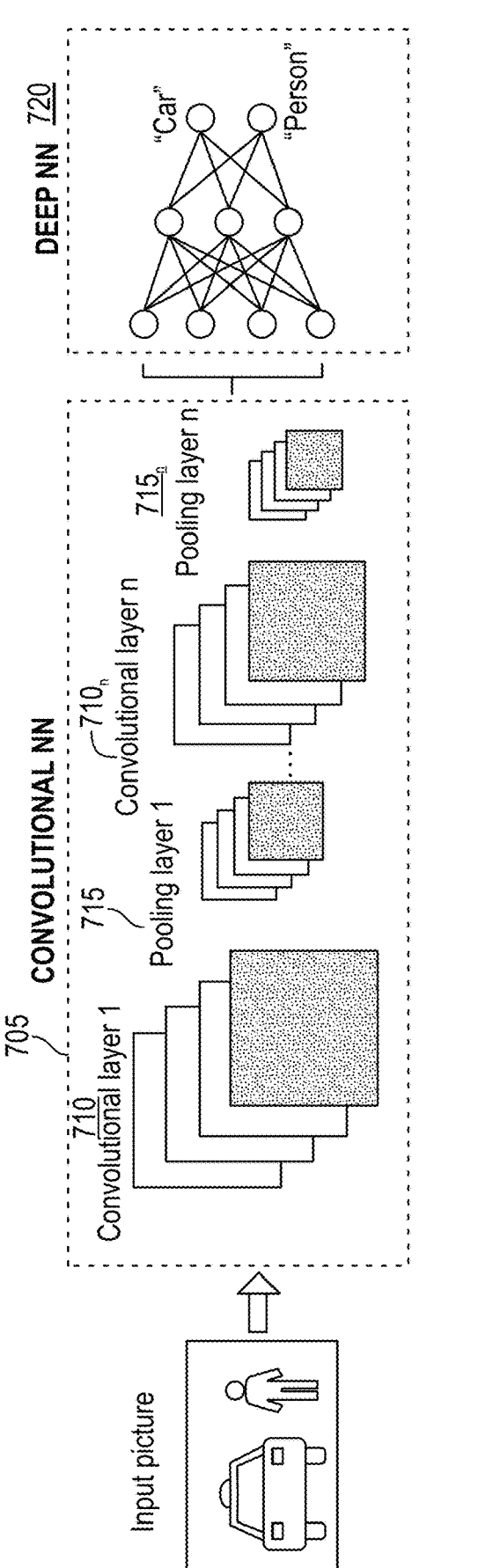
FIG. 7 is a schematic diagram illustrating an exemplary embodiment of a complete neural network.

FIG. 7 is a schematic diagram illustrating an exemplary embodiment of a complete neural network. The computational complexity of the encoder is typically linearly dependent on the size of the neural network backbone. While vertical optimization can, in some cases, reduce the amount of computation in the neural network backbone, the split point between the neural network backbone and neural network head is the main tool for computational offloading. The split point is preferably selected based on the criteria of energy consumption, computational capabilities as well as the bandwidth between the encoder and the decoder.

FIG. 7 is a schematic diagram illustrating an exemplary embodiment of a neural network as described in this disclosure, illustrating a combined convolutional neural network-deep neural network (CNN-DNN) architecture for machine learning for images and video data. Input image or video is passed through the convolutional neural network (CNN) 705 which uses series of processing steps comprising convolution layers 710 and pooling layers 715. Each layer in the network uses filters to process the input and outputs so-called feature maps, which are two-dimensional images containing certain level of details pertinent to the overall task. CNNs can have anywhere from two or three to tens of such layers. Lower layers filter small details of the input image such as edges and lines. As we progress through the higher layers of the CNN, the outputs more closely represent the features of interest of the task. For example, the highest layers in the CNN for face detection will produce feature maps that contain features such as eye contours, nose contours, etc. Output of the highest layer is "flattened" and passed through the deep neural network (DNN) 720, which outputs the probability that image contains certain object (e.g. "car", "cat"), with or without the location details.

Besides object detection tasks, same architecture with minor modifications can be used for object tracking, segmentation, event detection, and other tasks. As we have seen, the more generic features are represented at the lower layers of the CNN 705. Those features are shared between different objects, and sometimes even between different tasks. This fact is used in the design of the multi-task architectures. Parts of the neural networks that can be reused and do not change for different tasks are called "neural network backbone" (backbone). The rest of the neural network(s) that is modified based on the target task is called "neural network head" (head).

Figure 8:
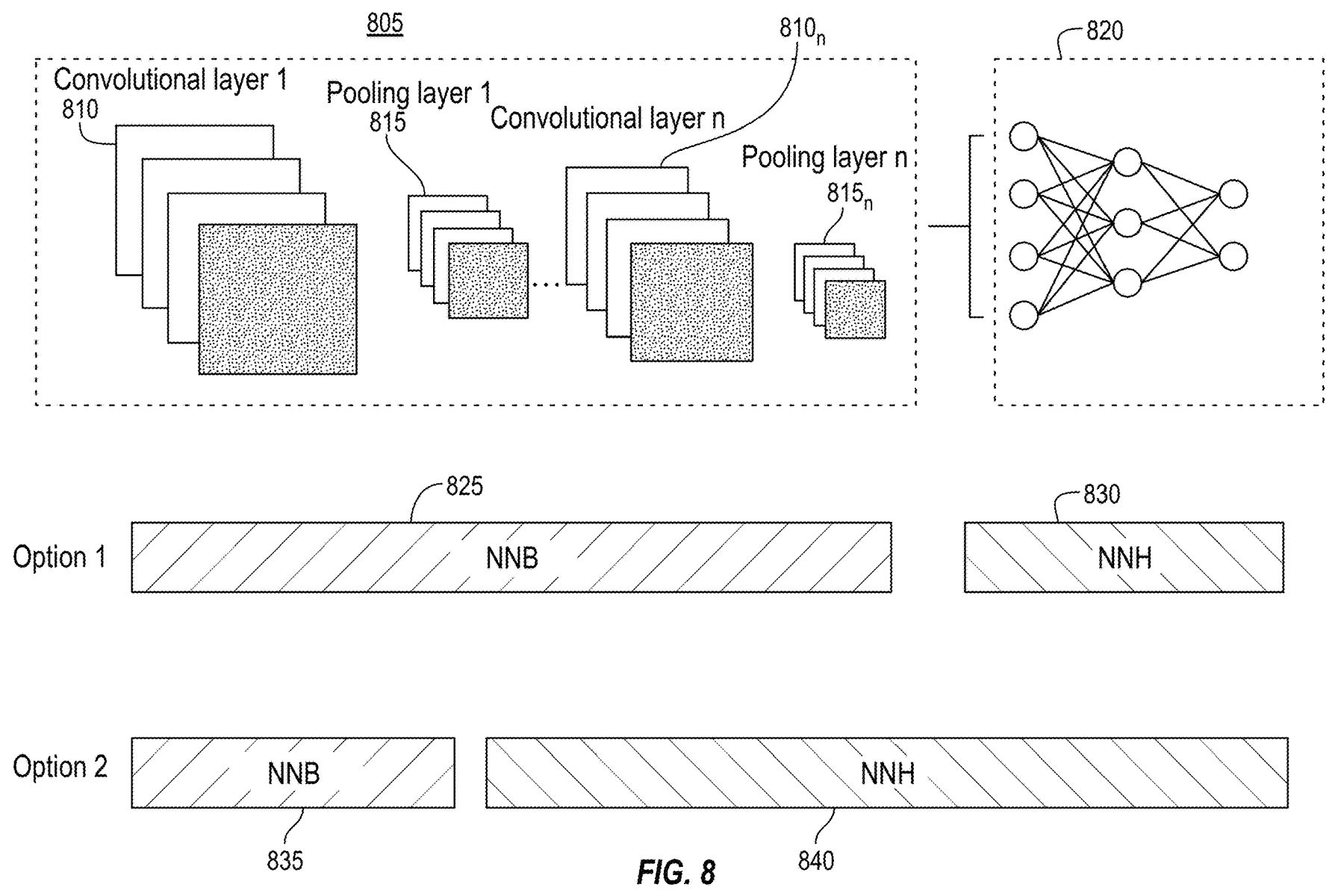

Referring to FIG. 8, two exemplary variants of a backbone-head separation of the multi-task architecture are shown. A process of training may be universal for all backbone-head architectures and variants—e.g., the backbone may be trained only once and all the parameters (such as connection weights and activation function thresholds) are not typically changed. Using this backbone, the head is added to it, such as by connecting the last layer of the backbone to the first layer of the head. Then the whole network is put through training such that backbone parameters are kept constant and only the parameters of the head are changed until the satisfactory performance is achieved on the training and/or validation datasets.

In FIG. 8, option 1, the entire CNN 805 is designated as a backbone 825, while the DNN 820 is designated as a head 830. This means that CNN 805 may be trained only once while the DNN 820 can be trained multiple times, each time for a separate task, or alternatively several DNNs 820 can be trained, each one for a separate task. This variant is most suitable for tasks that span different modalities—such as object detection and event detection. For example, the backbone can be trained to detect people, while a first head can be trained to identify persons and a second head trained to detect gatherings of certain number of people, respectively.

Still referring to FIG. 8, in option 2, only a first portion of the CNN 805, e.g., the first convolution layer 810 and first pooling layer 815 is designated as a backbone 835, while the rest of the CNN 805 together with the DNN 820 is designated as a head 840. Although FIG. 8 illustrates an example where only the first layer is included in the backbone, the number of lower layers of the CNN 805 that may optionally be included in the backbone can vary and be specified beforehand or decided upon during the training process. In general, all the lower layers that represent features which are most generic relative to the tasks are included in the backbone. This variant in FIG. 8 is most suitable for more generic task support. The backbone can be reused in the tasks for different object detection. For example, the backbone that detects contours and edges for both people and animals can be used to facilitate detection and tracking tasks of moving living objects.

The presented variants of option 1 and option 2 in FIG. 8 are selected only for illustrative purposes since the cut-off point for the backbone-head separation can be implemented at any layer of the CNN or DNN. In one extreme case, depicted in FIG. 8, the backbone contains only the first layer of the CNN. This implementation greatly reduces the computational load of the edge device, and offloads most of the computation to the central server. It will also, in most of the cases, produce larger bitstream. On the other extreme, the head can contain only the last layer of the DNN, and in this case almost the entire computation is conducted at the edge device.

To determine the correct cut-off point, system architect needs to decide which tradeoffs are appropriate for a given use case. Tradeoffs to consider are power consumption, computational constraints, bitstream bandwidth, etc. The decisions greatly depend on the type of devices that take up the role of the encoder, the decoder, and on the available communication channel.

Figure 9:
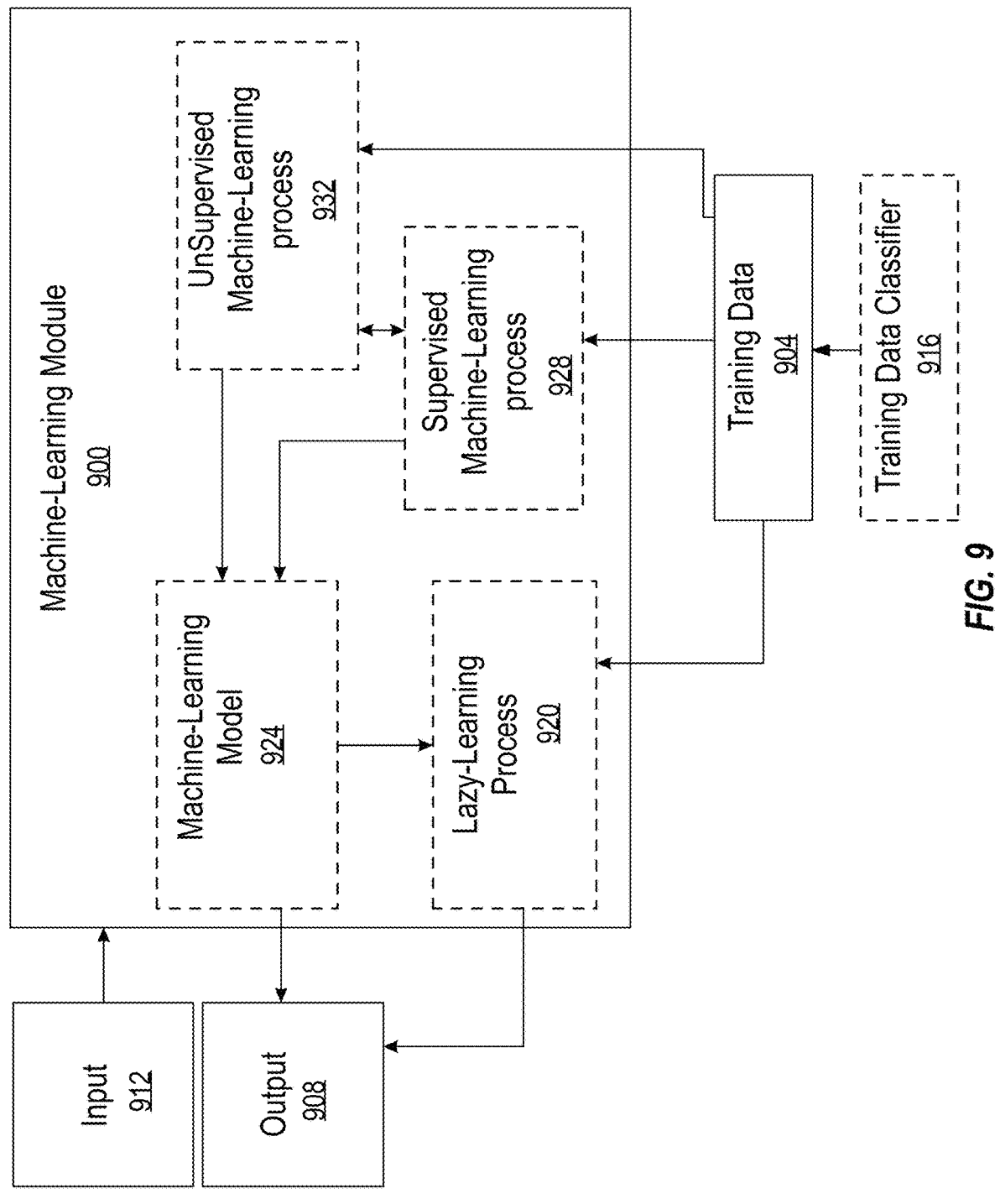
FIG. 9 is a block diagram illustrating an exemplary embodiment of a machine-learning module.

Referring now to FIG. 9, an exemplary embodiment of a machine-learning module 900 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 904 to generate an algorithm that will be performed by a computing device/module to produce outputs 908 given data provided as inputs 912; this is in contrast to a non-machine learning software program where the commands to be executed are determined in advance by a user and written in a programming language.

Still referring to FIG. 9, "training data," as used herein, is data containing correlations that a machine-learning process may use to model relationships between two or more categories of data elements. For instance, and without limitation, training data 904 may include a plurality of data entries, each entry representing a set of data elements that were recorded, received, and/or generated together; data elements may be correlated by shared existence in a given data entry, by proximity in a given data entry, or the like. Multiple data entries in training data 904 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 904 according to various correlations; correlations may indicate causative and/or predictive links between categories of data elements, which may be modeled as relationships such as mathematical relationships by machine-learning processes as described in further detail below. Training data 904 may be formatted and/or organized by categories of data elements, for instance by associating data elements with one or more descriptors corresponding to categories of data elements. As a non-limiting example, training data 904 may include data entered in standardized forms by persons or processes, such that entry of a given data element in a given field in a form may be mapped to one or more descriptors of categories. Elements in training data 904 may be linked to descriptors of categories by tags, tokens, or other data elements; for instance, and without limitation, training data 904 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 9, training data 904 may include one or more elements that are not categorized; that is, training data 904 may not be formatted or contain descriptors for some elements of data. Machine-learning algorithms and/or other processes may sort training data 904 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 904 to be made applicable for two or more distinct machine-learning algorithms as described in further detail below. Training data 904 used by machine-learning module 900 may correlate any input data as described in this disclosure to any output data as described in this disclosure. As a non-limiting illustrative example Further referring to FIG. 9, training data may be filtered, sorted, and/or selected using one or more supervised and/or unsupervised machine-learning processes and/or models as described in further detail below; such models may include without limitation a training data classifier 916. Training data classifier 916 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 900 may generate a classifier using a classification algorithm, defined as a process whereby a computing device and/or any module and/or component operating thereon derives a classifier from training data 904. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

Still referring to FIG. 9, machine-learning module 900 may be configured to perform a lazy-learning process 920 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 904. Heuristic may include selecting some number of highest-ranking associations and/or training data 904 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 9, machine-learning processes as described in this disclosure may be used to generate machine-learning models 924. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 924 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 924 may be generated by creating an artificial neural network, such as a convolutional neural network comprising an input layer of nodes, one or more intermediate layers, and an output layer of nodes. Connections between nodes may be created via the process of "training" the network, in which elements from a training data 904 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 9, machine-learning algorithms may include at least a supervised machine-learning process 928. At least a supervised machine-learning process 928, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include inputs and outputs as described above in this disclosure, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 904. Persons skilled in the art, upon reviewing the entirety of this disclosure, will be aware of various possible variations of at least a supervised machine-learning process 928 that may be used to determine relation between inputs and outputs. Supervised machine-learning processes may include classification algorithms as defined above.

Further referring to FIG. 9, machine learning processes may include at least an unsupervised machine-learning processes 932. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 9, machine-learning module 900 may be designed and configured to create a machine-learning model 924 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g., a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 9, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Figure 10:
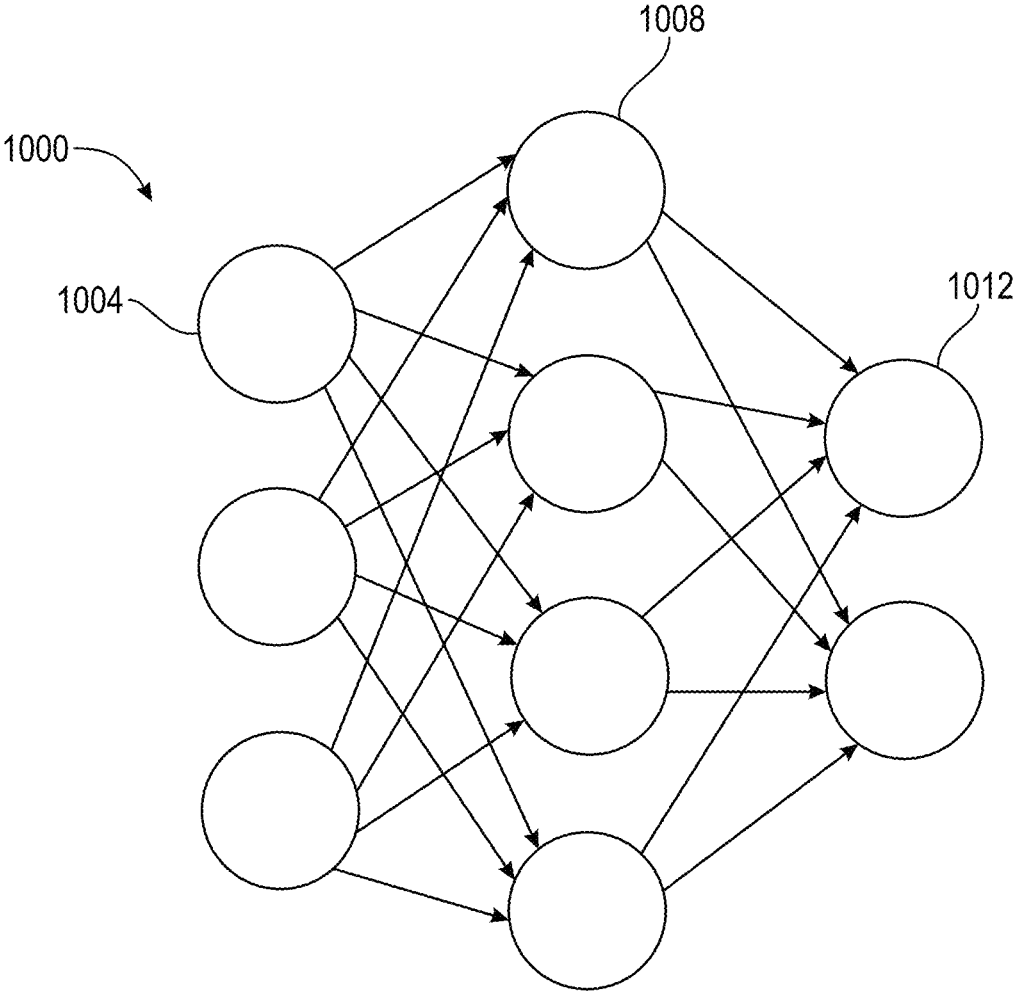
FIG. 10 is a schematic diagram illustrating an exemplary embodiment of neural network.

Referring now to FIG. 10, an exemplary embodiment of neural network 1000 is illustrated. A neural network 1000 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network."

Figure 11:
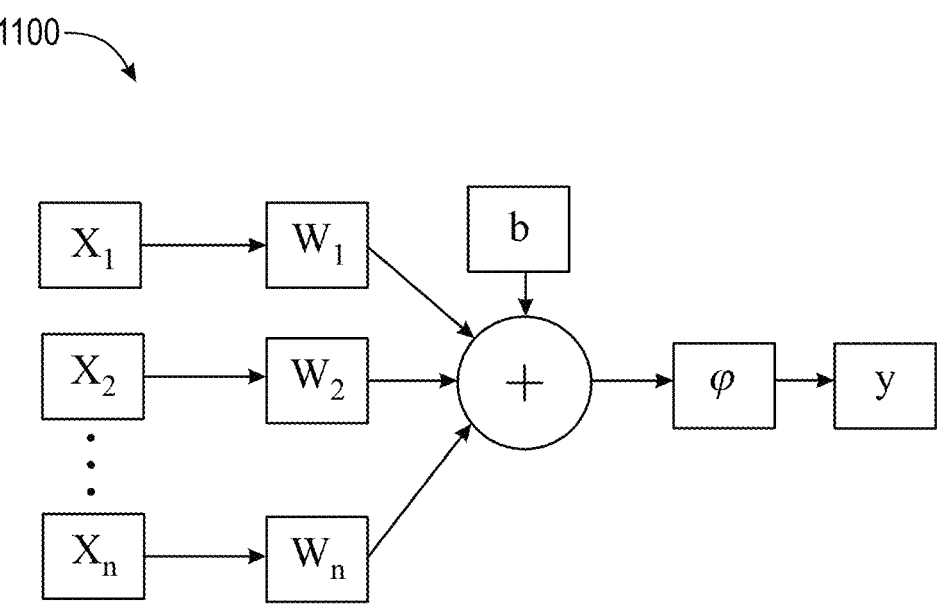
FIG. 11 is a schematic diagram illustrating an exemplary embodiment of a node of a neural network.

Referring now to FIG. 11, an exemplary embodiment of a node of a neural network is illustrated. A node may include, without limitation a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function p, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Still referring to FIG. 11, a "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like. CNN may include, without limitation, a deep neural network (DNN) extension, where a DNN is defined as a neural network with two or more hidden layers.

Generative Adversarial Model

A Generative Adversarial Model (GAM) is based on the idea of the Generative Adversarial Network (GAN). GAN is a special case of GAM where the generator and discriminator components are implemented as neural networks (NN).

Figure 12:
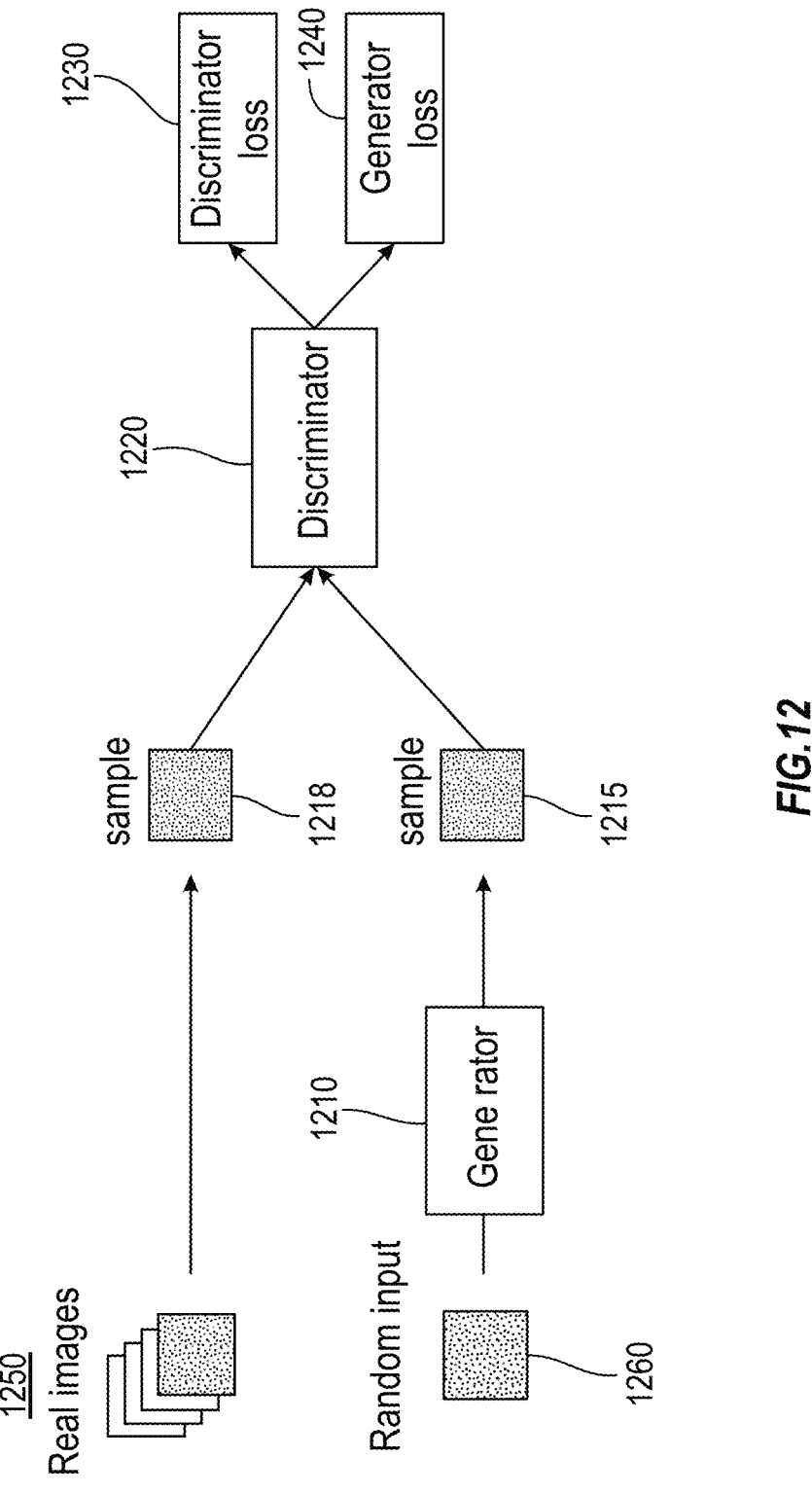
FIG. 12 is a simplified block diagram of an exemplary generative adversarial model ("GAM").

FIG. 12 is a simplified example of a GAM framework. The primary components of the GAM are the generator 1210 (G) and the discriminator 1220 (D). The generator 1210 learns to generate plausible data. The generated instances become negative training examples for the discriminator 1220. The discriminator 1220 learns to distinguish the generator's "fake" sample data 1215 from real sample data 1218. The discriminator 1220 penalizes the generator 1210 for producing implausible results. The output of the discriminator 1220 is compared with the real input data 1218 to produce two loss functions, discriminator loss 1230 and generator loss 1240, which are used to adjust parameters of the discriminator 1220 and the generator 1210, respectively.

The discriminator 1220 is a classifier which tries to distinguish real data 1218 from the "fake" data 1215 created by the generator 1210. The discriminator 1220 can use any network architecture appropriate to the type of data that is being classified. The discriminator's training data typically comes from two sources. Real data instances 1218, such as real pictures 1250 of objects of interest, such as people, cars, buildings, and the like. The discriminator uses these instances as positive examples during training. Fake data instances 1215 are created by the generator 1210 based on random input data 1260. The discriminator 1220 uses these instances of fake data from the generator 1210 as negative examples during training. The training procedure that involves two intertwined phases is further depicted in FIG. 13.

Figures 13A, 13B:
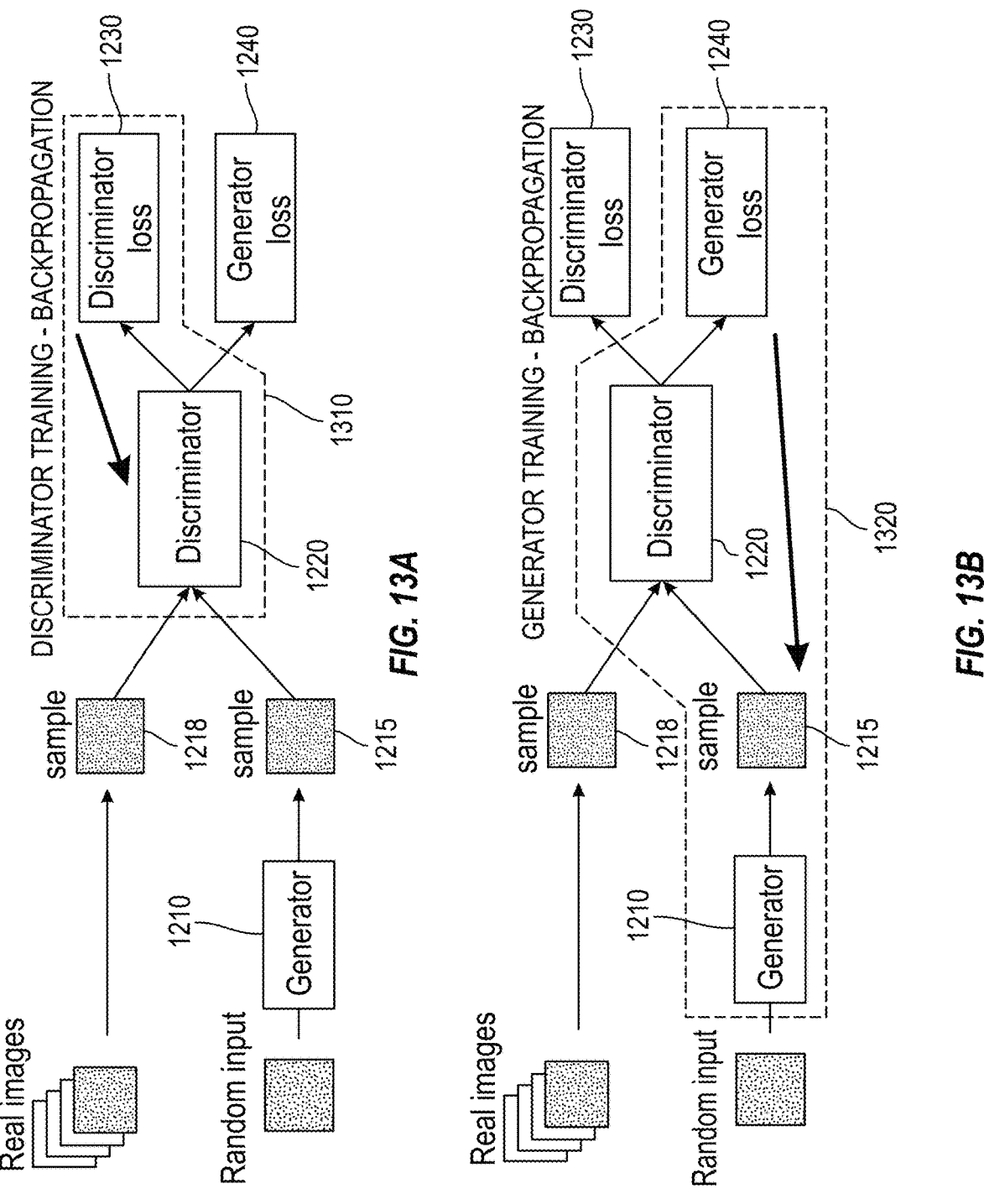
FIGS. 13A and 13B are simplified block diagrams illustrating an exemplary training process for the discriminator and generator, respectively, of a GAM such as shown in FIG. 12.

The discriminator connects to two loss functions 1230 and 1240. Referring to FIG. 13A, during a discriminator training phase, the discriminator 1220 ignores the generator loss 1240 and just uses the discriminator loss 1230. During discriminator training the discriminator 1220 classifies both real data and fake data from the generator 1210. The discriminator loss penalizes the discriminator 1220 for misclassifying a real instance as fake or a fake instance as real. If implemented as a neural network, the discriminator 1220 updates its weights through backpropagation 1310 from the discriminator loss 1230 through the discriminator 1220.

Referring to FIG. 13B, the generator 1210 learns to create fake data by incorporating feedback 1320 from the discriminator 1220. Through this feedback, the generator 1210 learns to generate data such that the discriminator 1220 classifies its output as real. Generator training typically requires tighter integration between G and D than discriminator training requires. The portion of the GAM that trains the generator 1210 includes a source of random input data, generator 1210 which transforms the random input into a fake data instance, discriminator 1220 which classifies the generated data, and the generator loss function 1240, which penalizes the generator for failing to fool the discriminator.

In one example, the generator training phase can be performed with the following steps which are schematically shown in FIG. 13B: sample random noise, produce generator output from sampled random noise, get discriminator classification for the generator output, calculate the loss function from the discriminator classification, and back-propagate 1320 through both the discriminator 1220 and generator 1210 to obtain gradients. If a neural network is used, utilize gradients to change only the generator weights.

The overall GAM training is preferably done by alternating the discriminator and generator training phases. For example, the discriminator can train for one or more epochs, the generator can train for one or more epochs, and those phases can be repeated.

Preferably, the generator 1210 is kept substantially constant during the discriminator 1220 training phase. As discriminator training works to distinguish real data from fake, it may also learn how to recognize the generator's flaws. This is a different problem for a thoroughly trained generator than it is for an untrained generator that produces random output. Similarly, it is preferable to keep the discriminator 1220 substantially constant during the generator 1210 training phase. Otherwise, the generator 1210 may be in in an environment where its training is "trying to hit a moving target" which may lead to convergence problems.

To reach the end of the training, a unified loss function is employed that is shared between the discriminator 1220 and generator 1210, which combines the two losses that need to be minimized.

The function can be of the following form:

$$L_{DG} = E_x[\log D(x)] + E_z[\log(1 - D(G(z)))],$$

where:

D(x) is the discriminator's estimate of the probability that real data instance x is real, $E_x$ is the expected value over all real data instances, G(z) is the generator's output when given noise z, D(G(z)) is the discriminator's estimate of the probability that a fake instance is real, and $E_z$ is the expected value over all random inputs to the generator (in effect, the expected value over all generated fake instances G(z)).

The formula derives from the cross-entropy between the real and generated distributions. In this case, the discriminator is trying to maximize $L_{DG}$, while the generator is trying to minimize it.

Compression-Decision GAM

Figure 14:
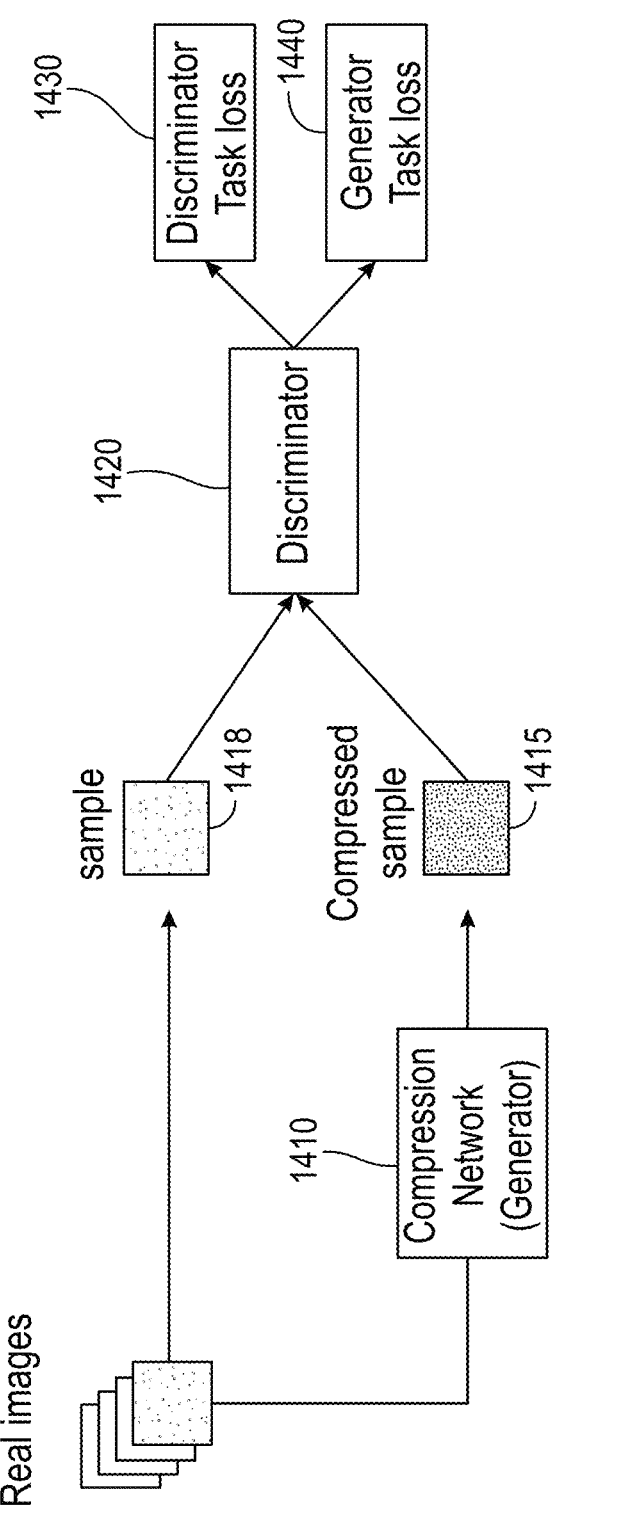
FIG. 14 is a simplified block diagram of an exemplary embodiment of a GAM framework in accordance with the present disclosure.

For the purposes of the present video encoding/decoding framework, the GAM paradigm can be implemented such that the role of the generator is delegated to the neural network for image/video compression, such as High-fidelity Generative Image Compression ("HiFiC"), or a similar AI-based compression system (such as JPEG AI), whereas the role of the discriminator is delegated to the decision network which completes a task such as object detection, object tracking, segmentation, and similar. Referring to FIG. 14, the compressor (generator) 1410 and the task-network (discriminator) 1420 can be trained in a similar manner as a regular generator and discriminator in the GAM, with changes specified below.

The components of the framework are depicted in FIG. 14. The model is called compression-decision GAM ("CD- GAM") because the role of the generator 1410 and discriminator 1420 is now to compress and decide, respectively. This framework involves a number of modifications to the GAM described above. For example, the input to the generator 1410 is now the same input image data 1405 that is passed to the discriminator 1420. Instead of trying to generate similar representations of the input image from a random signal, the compressor 1410 is trying to compress the input image to the minimal compressed representation that results in same or similar loss as the original image. In this way, the discriminator 1420 receives samples of the actual image data 1418 and samples of the compressed image data 1415 for comparison.

Further, the training objective includes a compression optimizer, since the goal is to find the minimal compressed representation of the input image that still "looks" the same to the discriminator. For this purpose, the loss function can be modified as follows:

$$L_{CD} = E_x[\log D(x)] + E_x[\log(1 - D(C(x)))]$$

$$\text{Subject to } R(C(x)) < R_T.$$

Here, C(x) is the output of the compression network (generator), the R(C(x)) is the rate in bits of the compressed representation, and the $R_T$ is a rate threshold.

Hybrid System with CDGAM

The pretrained components of the CDGAM can be distributed as parts of a hybrid system that is used for image/video coding for the specific task, or for the multi-task uses cases. The end user of the system can either be machine or human, or both. The implementation of the proposed model can be performed using neural network architecture as described herein.

Figure 15:
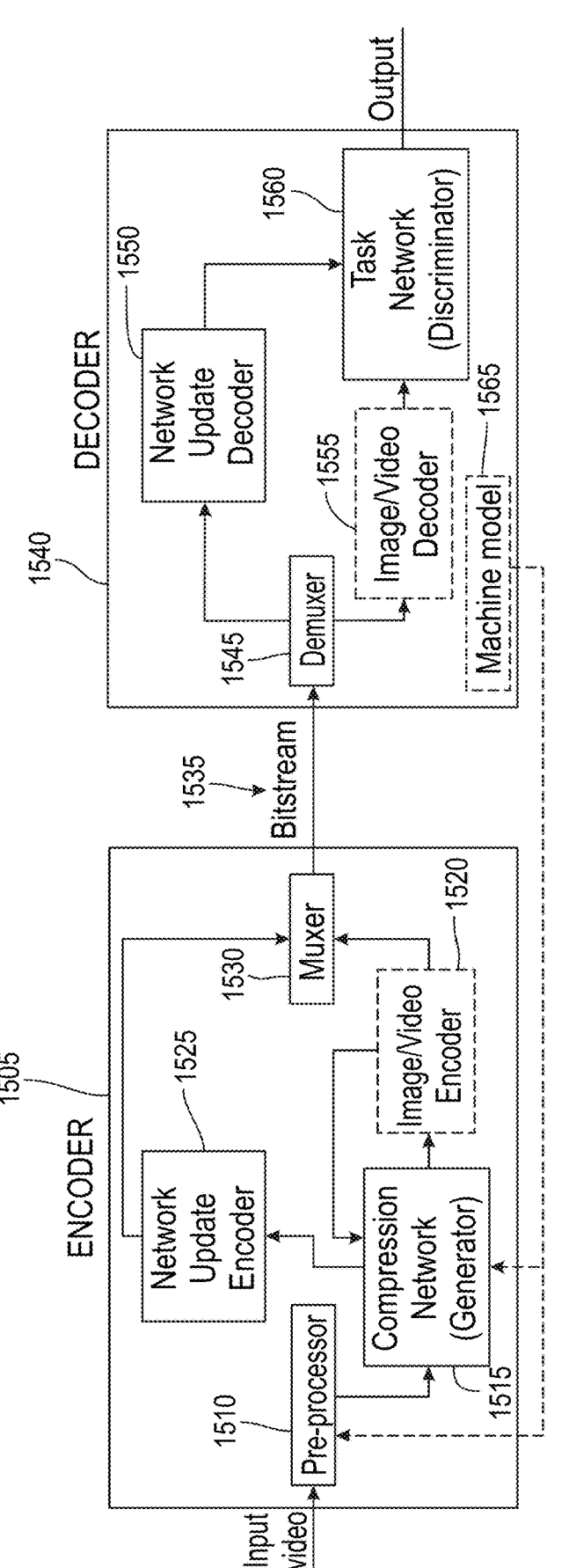
FIG. 15 is a simplified block diagram illustrating a video encoding and decoding system, such as a VCM framework, employing a compression-decision GAM ("CDGAM") in accordance with the present disclosure.

FIG. 15 is a simplified block diagram illustrating an example of a hybrid framework for video encoding and decoding with the CDGAM. The pre-trained generator 1515 is implemented at the encoder side. Encoder 1505 includes a pre-processor 1510 which receives the input image/video and converts it to a format that is acceptable as input for the compression network 1515. The pre-processor 1510 implements algorithms such as resolution scaling, framerate sampling, color conversion, etc. In some cases, the pre-processor 1510 can be configured to implement more complex algorithms, such as edge detection, keypoint detection, morphological operations, etc. With the more complex algorithms, the pre-processor 1510 can pass only portions of the input image/video that contain regions-of-interest. In some cases, such operations can result in the lower overall complexity/runtime, and lower energy use of the encoder.

The compression network (generator) 1515 receives the pre-processed image/video and transforms it to the compressed representation according to the model that is pre-trained, as described above. Based on the characteristics of the pre-processed image/video, such as the spatial or temporal complexity expressed as the high spatial or temporal frequency, the current conditions of the encoder energy supply (such as the battery level), and the network conditions, the compression network 1515 might implement low-complexity inference, in which some parts of the network are changed, or removed (pruned). Such changes are then sent as the output of the compression network 1515.

The image/video encoder 1520 can be provided as an optional component that is present at the encoder for two purposes—to further compress the compressed image/video, or to compress pre-processed image/video in cases where compression network 1515 is not able to compress them. Such cases might arise in energy-saving modes, or if the output of the compression network 1515 is corrupted.

In the case of additional compression, the compressed output of the compression network 1515 is passed to the image/video encoder 1520 which implements efficient video encoding standard such as, but not limited to, the Versatile Video Coding (VVC). The video encoder 1520 and the compression network 1515 are connected with a feedback loop which allows the adjustment of parameters of the compression network 1515 to produce input to the encoder 1520 which serves to provide optimal compression. The joint-optimization process through this can be achieved is described in the inventors international patent application PCT/US22/40722 filed on Aug. 18, 2022 and titled Systems and Methods for Joint Optimization Training and Encoder Side Downsampling, the entirety of which is hereby incorporated by reference in its entirety.

Still referring to FIG. 15, a network update encoder 1525 is coupled to the compression network 1515 and is active when there are changes to the compression network 1515. Any changes to the compression network parameters can be encoded using symbolic statistical compression and passed to a multiplexer (muxer) 1530. The muxer 1530 multiplexes the two substreams, i.e., the compressed images/video and network updates, into a unified bitstream 1535, which is sent over a channel to the decoder 1540.

At the decoder 1540 the bitstream 1535 is received at a demuxer 1545 which parses the high level syntax of the bitstream and splits the received unified bitstream into a network update substream and image/video substream.

A network update decoder 1550 receives the network update substream, if present, and parses and decodes it, using the inverse operations conducted by the network update encoder 1525 in a manner generally known in the art.

An image/video decoder 1555 can optionally be provided and can be active in those cases when the image/video encoder 1520 is used on the encoder side 1505 to encode image data. The image/video decoder, when active, parses and decodes the image/video substream and produces the decoded image/video which is an input to the final task network 1560.

The task network (discriminator) 1560 is the second part of the CDGAM, which is pre-trained together with the compression network 1515, and is used to process the compressed image/video and produce output suitable for the task completion. If the task network 1560 receives non-empty input from the network update decoder 1550 with updates from the compression network (generator) 1515, it accordingly updates its own parameters. In some cases, this requires retraining of the CDGAM and can be conducted offline, and outside of the decoder 1540.

A machine model 1565 contains current state and potential updates of the CDGAM parameters, including updates to the pre-processor 1510. It can be optionally stored at the decoder 1540, or it can be situated at the third-party location, from where it sends updates to both the encoder 1505 and the decoder 1540 using an available communication channel.

In applications where a human is the end user, such as entertainment and surveillance, the system can encode the image/video using only the image/video encoder 1520, or it can alternatively use CDGAM that is trained in such a way that the compressed image is perceptually as close as possible to the input image, for example using the usual objective quality metrics such as PSNR, SSIM, or the like, as its loss function.

Another application for the proposed framework for machine use may only require that the system encodes only features, and not necessarily whole image/video. In this case the CDGAM can be trained using the generator 1515 that transforms the input image into the features, such as intermediate feature map of the convolutional neural network, or any other lower-dimensional representation of the input image. The discriminator 1560 takes the features and produces the output decision. The generator 1515 is trying to compress the features to a smaller representation, and the loss function is a standard task-dependent loss function, such as cross-entropy. The encoder 1505 can additionally use the image/video encoder 1520 to further compress the compressed features.

The encoder 1505 can also implement multiple instances of the compression network 1515, and the decoder 1540 can accordingly implement multiple instances of the task network 1560, to support multi-task use cases. The network selection in such cases can be orchestrated from the machine model 1565 and implemented through the pre-processor 1510.

Bitstream

Figure 16:
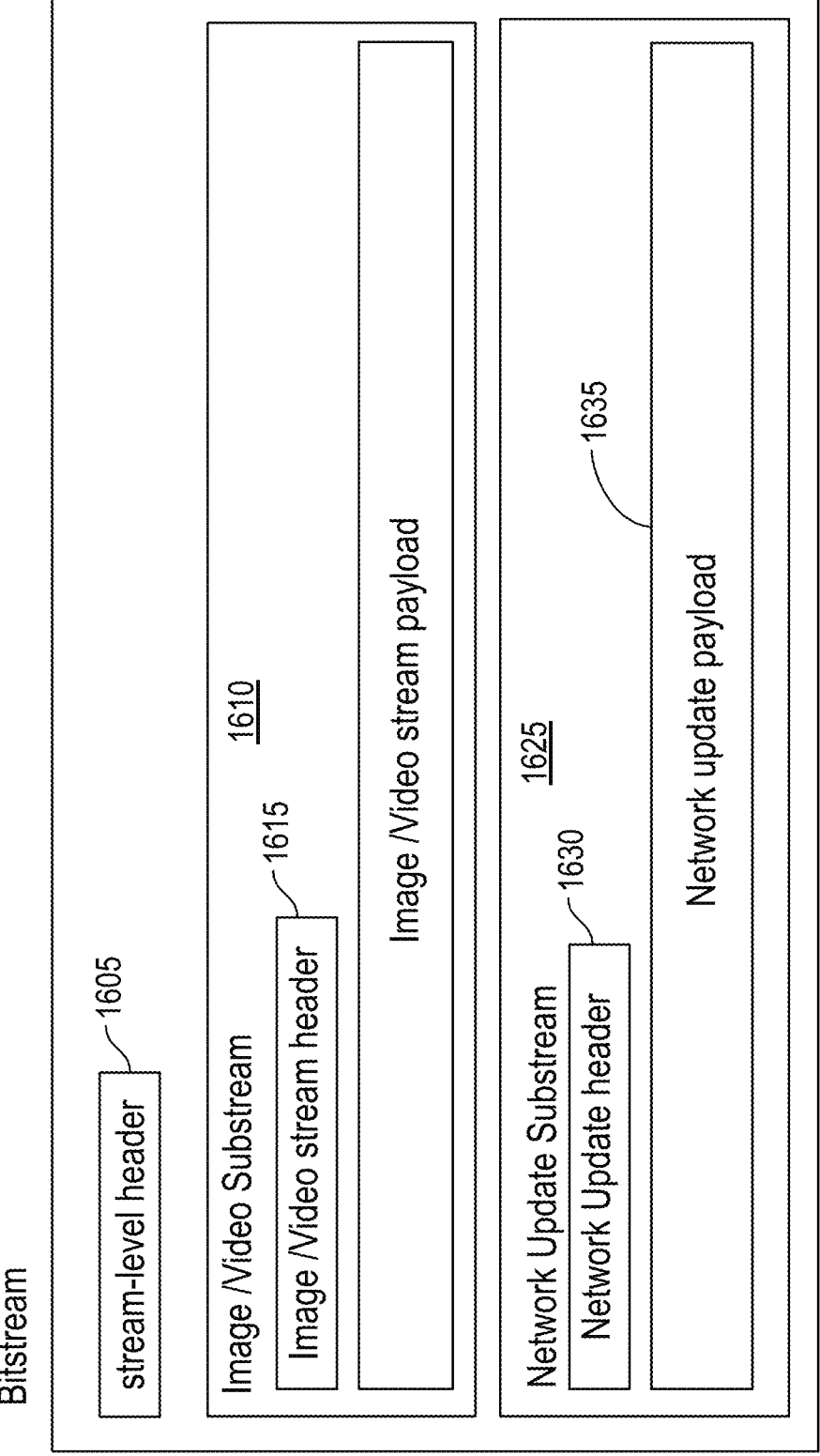
FIG. 16 is a schematic diagram illustrating an exemplary bitstream construct in accordance with an embodiment of the present disclosure.

A bitstream 1535 that is produced by the encoder 1505 preferably contains the image/video substream and the network update substream. An exemplary bitstream structure for the present systems and methods is depicted in FIG. 16.

The bitstream 1535 preferably includes a stream level header 1605 as well as image video substream 1610 and a network update substream 1625. Either one of the substreams can be empty. The presence of the substreams as well as the length and type of the present substreams are generally described by the parameters in the stream-level header 1605.

The image/video substream 1610 contains the image/video stream header 1615 that describes the elements of the image/video stream and the image/video stream payload 1620. Image/video stream header 1615 typically contains parameters that describe type and length of the coded units of the image/video stream payload 1620.

The network update substream 1625 preferably contains a network update stream header 1630 that describes the elements of the network update substream 1625 and the network update substream payload 1635 that contains binary representation of the modifications to the compression network 1515. The network update stream header 1630 contains parameters that describe type and length of the network update elements.

If the decoder 1540 doesn't have a full description of the pre-trained generator 1515, the encoder 1505 can signal the description to the decoder 1540, such as by using standard indexed table entries, and in the case of neural networks, the network description such as the Open Neural Network Exchange (ONNX). This can save bandwidth and reduce or eliminate a need to send the complete network description as part of the bitstream.

Figure 17:
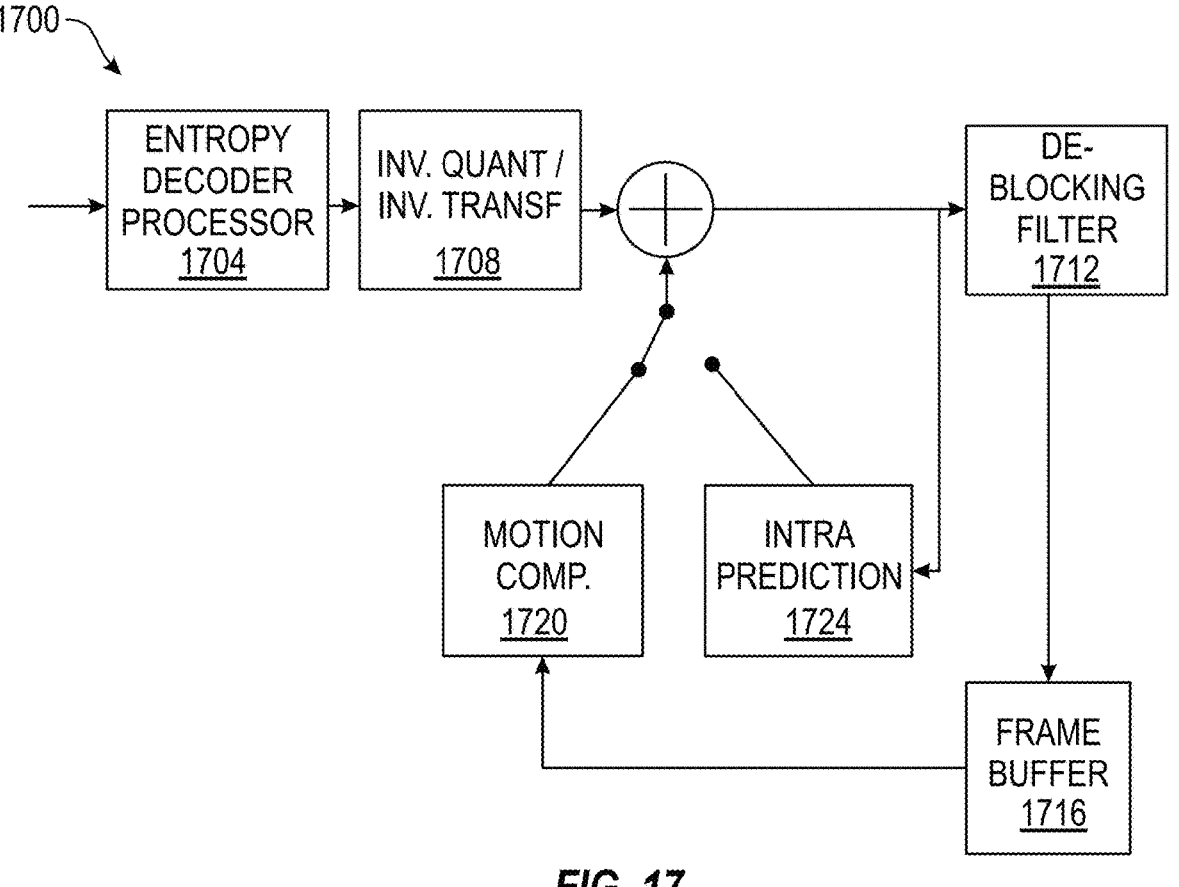
FIG. 17 is a block diagram illustrating an exemplary embodiment of a video decoder.

FIG. 17 is a system block diagram illustrating an example decoder 1700 capable of adaptive cropping. Decoder 1700 may include an entropy decoder processor 1704, an inverse quantization and inverse transformation processor 1708, a deblocking filter 1712, a frame buffer 1716, a motion compensation processor 1720 and/or an intra prediction processor 1724.

In operation, and still referring to FIG. 17, bit stream 1728 may be received by decoder 1700 and input to entropy decoder processor 1704, which may entropy decode portions of bit stream into quantized coefficients. Quantized coefficients may be provided to inverse quantization and inverse transformation processor 1708, which may perform inverse quantization and inverse transformation to create a residual signal, which may be added to an output of motion compensation processor 1720 or intra prediction processor 1724 according to a processing mode. An output of the motion compensation processor 1720 and intra prediction processor 1724 may include a block prediction based on a previously decoded block. A sum of prediction and residual may be processed by deblocking filter 1712 and stored in a frame buffer 1716.

In an embodiment, and still referring to FIG. 17 decoder 1700 may include circuitry configured to implement any operations as described above in any embodiment as described above, in any order and with any degree of repetition. For instance, decoder 1700 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Decoder may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Figure 18:
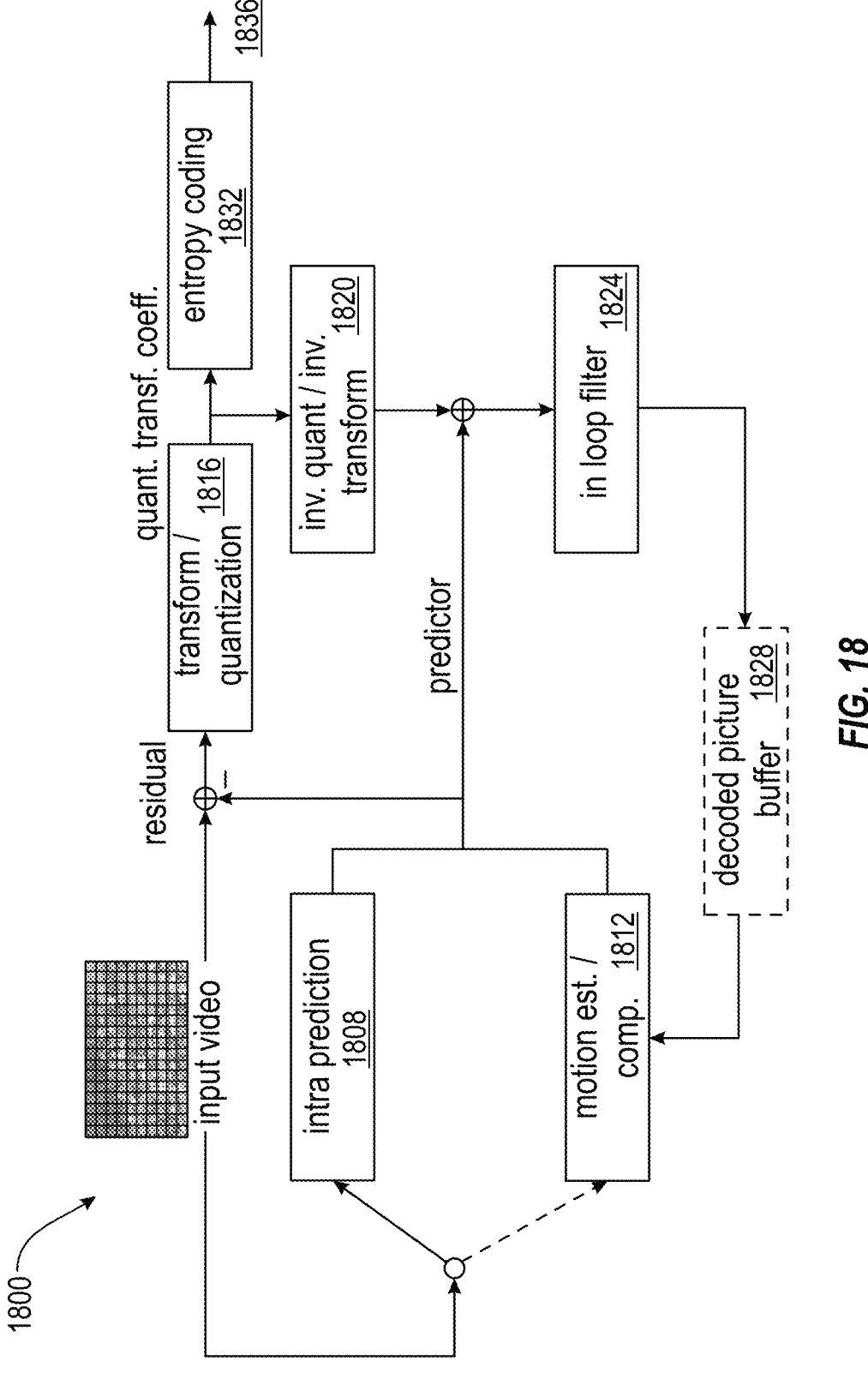
FIG. 18 is a block diagram illustrating an exemplary embodiment of a video encoder.

FIG. 18 is a system block diagram illustrating an example video encoder 1800 capable of adaptive cropping. Example video encoder 1800 may receive an input video 1804, which may be initially segmented or dividing according to a processing scheme, such as a tree-structured macro block partitioning scheme (e.g., quad-tree plus binary tree). An example of a tree-structured macro block partitioning scheme may include partitioning a picture frame into large block elements called coding tree units (CTU). In some implementations, each CTU may be further partitioned one or more times into a number of sub-blocks called coding units (CU). A final result of this portioning may include a group of sub-blocks that may be called predictive units (PU). Transform units (TU) may also be utilized.

Still referring to FIG. 18, example video encoder 1800 may include an intra prediction processor 1808, a motion estimation/compensation processor 1812, which may also be referred to as an inter prediction processor, capable of constructing a motion vector candidate list including adding a global motion vector candidate to the motion vector candidate list, a transform/quantization processor 1816, an inverse quantization/inverse transform processor 1820, an in-loop filter 1824, a decoded picture buffer 1828, and/or an entropy coding processor 1832. Bit stream parameters may be input to the entropy coding processor 1832 for inclusion in the output bit stream 1836.

In operation, and with continued reference to FIG. 18, for each block of a frame of input video, whether to process block via intra picture prediction or using motion estimation/compensation may be determined. Block may be provided to intra prediction processor 1808 or motion estimation/compensation processor 1812. If block is to be processed via intra prediction, intra prediction processor 1808 may perform processing to output a predictor. If block is to be processed via motion estimation/compensation, motion estimation/compensation processor 1812 may perform processing including constructing a motion vector candidate list including adding a global motion vector candidate to the motion vector candidate list, if applicable.

Further referring to FIG. 18, a residual may be formed by subtracting a predictor from input video. Residual may be received by transform/quantization processor 1816, which may perform transformation processing (e.g., discrete cosine transform (DCT)) to produce coefficients, which may be quantized. Quantized coefficients and any associated signaling information may be provided to entropy coding processor 1832 for entropy encoding and inclusion in output bit stream 1836. Entropy encoding processor 1832 may support encoding of signaling information related to encoding a current block. In addition, quantized coefficients may be provided to inverse quantization/inverse transformation processor 1820, which may reproduce pixels, which may be combined with a predictor and processed by in loop filter 1824, an output of which may be stored in decoded picture buffer 1828 for use by motion estimation/compensation processor 1812 that is capable of constructing a motion vector candidate list including adding a global motion vector candidate to the motion vector candidate list.

With continued reference to FIG. 18, although a few variations have been described in detail above, other modifications or additions are possible. For example, in some implementations, current blocks may include any symmetric blocks (8×8, 16×16, 32×32, 64×64, 128×128, and the like) as well as any asymmetric block (8×4, 16×8, and the like).

In some implementations, and still referring to FIG. 18, a quadtree plus binary decision tree (QTBT) may be implemented. In QTBT, at a Coding Tree Unit level, partition parameters of QTBT may be dynamically derived to adapt to local characteristics without transmitting any overhead. Subsequently, at a Coding Unit level, a joint-classifier decision tree structure may eliminate unnecessary iterations and control the risk of false prediction. In some implementations, LTR frame block update mode may be available as an additional option available at every leaf node of QTBT.

In some implementations, and still referring to FIG. 18, additional syntax elements may be signaled at different hierarchy levels of bitstream. For example, a flag may be enabled for an entire sequence by including an enable flag coded in a Sequence Parameter Set (SPS). Further, a CTU flag may be coded at a coding tree unit (CTU) level.

Some embodiments may include non-transitory computer program products (i.e., physically embodied computer program products) that store instructions, which when executed by one or more data processors of one or more computing systems, cause at least one data processor to perform operations herein.

Still referring to FIG. 18, encoder 1800 may include circuitry configured to implement any operations as described above in any embodiment, in any order and with any degree of repetition. For instance, encoder 1800 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Encoder 1800 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 18, non-transitory computer program products (i.e., physically embodied computer program products) may store instructions, which when executed by one or more data processors of one or more computing systems, causes at least one data processor to perform operations, and/or steps thereof described in this disclosure, including without limitation any operations described above and/or any operations decoder 900 and/or encoder 1800 may be configured to perform. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including a connection over a network (e.g. the Internet, a wireless wide area network, a local area network, a wide area network, a wired network, or the like), via a direct connection between one or more of the multiple computing systems, or the like.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random-access memory "RAM"

device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 19:
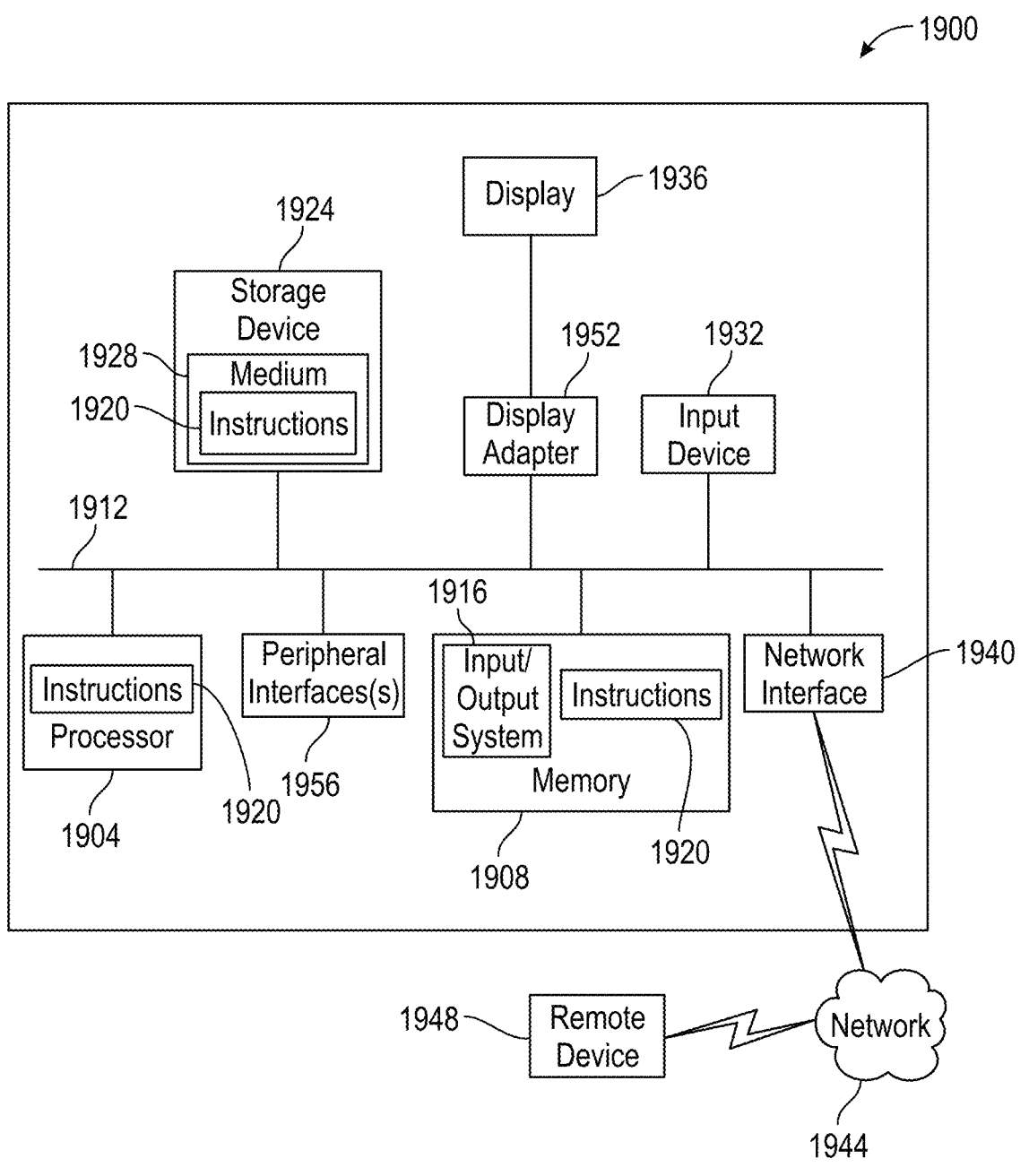
FIG. 19 is a block diagram of a computing system that can be used to implement any one or more of the methodologies disclosed herein and any one or more portions thereof.

FIG. 19 shows a diagrammatic representation of one embodiment of a computing device in the exemplary form of a computer system 1900 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 1900 includes a processor 1904 and a memory 1908 that communicate with each other, and with other components, via a bus 1912. Bus 1912 may include any of several types of bus structures including, but not limited to, a memory bus, a memory controller, a peripheral bus, a local bus, and any combinations thereof, using any of a variety of bus architectures.

Processor 1904 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 1904 may be organized according to Von Neumann and/or Harvard architecture as a non-limiting example. Processor 1904 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating-point unit (FPU), and/or system on a chip (SoC)

Memory 1908 may include various components (e.g., machine-readable media) including, but not limited to, a random-access memory component, a read only component, and any combinations thereof. In one example, a basic input/output system 1916 (BIOS), including basic routines that help to transfer information between elements within computer system 1900, such as during start-up, may be stored in memory 1908. Memory 1908 may also include (e.g., stored on one or more machine-readable media) instructions (e.g., software) 1920 embodying any one or more of the aspects and/or methodologies of the present disclosure. In another example, memory 1908 may further include any number of program modules including, but not limited to, an operating system, one or more application programs, other program modules, program data, and any combinations thereof.

Computer system 1900 may also include a storage device 1924. Examples of a storage device (e.g., storage device 1924) include, but are not limited to, a hard disk drive, a magnetic disk drive, an optical disc drive in combination with an optical medium, a solid-state memory device, and any combinations thereof. Storage device 1924 may be connected to bus 1912 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1924 (or one or more components thereof) may be removably interfaced with computer system 1900 (e.g., via an external port connector (not shown)). Particularly, storage device 1924 and an associated machine-readable medium 1928 may provide nonvolatile and/or volatile storage of machine-readable instructions, data structures, program modules, and/or other data for computer system 1900. In one example, software 1920 may reside, completely or partially, within machine-readable medium 1928. In another example, software 1920 may reside, completely or partially, within processor 1904.

Computer system 1900 may also include an input device 1932. In one example, a user of computer system 1900 may enter commands and/or other information into computer system 1900 via input device 1932. Examples of an input device 1932 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1932 may be interfaced to bus 1912 via any of a variety of interfaces (not shown) including, but not limited to, a serial interface, a parallel interface, a game port, a USB interface, a FIRE-WIRE interface, a direct interface to bus 1912, and any combinations thereof. Input device 1932 may include a touch screen interface that may be a part of or separate from display 1936, discussed further below. Input device 1932 may be utilized as a user selection device for selecting one or more graphical representations in a graphical interface as described above.

A user may also input commands and/or other information to computer system 1900 via storage device 1924 (e.g., a removable disk drive, a flash drive, etc.) and/or network interface device 1940. A network interface device, such as network interface device 1940, may be utilized for connecting computer system 1900 to one or more of a variety of networks, such as network 1944, and one or more remote devices 1948 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1944, may employ a wired and/or a wireless mode of communication. In general, any network topology may be used. Information (e.g., data, software 1920, etc.) may be communicated to and/or from computer system 1900 via network interface device 1940.

Computer system 1900 may further include a video display adapter 1952 for communicating a displayable image to a display device, such as display device 1936. Examples of a display device include, but are not limited to, a liquid crystal display (LCD), a cathode ray tube (CRT), a plasma display, a light emitting diode (LED) display, and any combinations thereof. Display adapter 1952 and display device 1936 may be utilized in combination with processor 1904 to provide graphical representations of aspects of the present disclosure. In addition to a display device, computer system 1900 may include one or more other peripheral output devices including, but not limited to, an audio speaker, a printer, and any combinations thereof. Such peripheral output devices may be connected to bus 1912 via a peripheral interface 1956. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A video encoder for a machine-video application comprising:

a preprocessor receiving an input signal, the preprocessor including at least a portion of a convolutional neural network outputting an intermediate feature map representing the input signal for a particular machine task;

a compression network coupled to the preprocessor, the compression network comprising a pretrained generator in a compression-decision generative adversarial model, the generator being trained to compress the intermediate feature map to a minimal compressed representation that results in an acceptably similar loss to a discriminator for the machine task as the intermediate feature map; and a video encoder coupled to the compression network and generating an encoded machine task bitstream.

2. The video encoder of claim 1, wherein the compression network is trained with a discriminator providing a generator loss function that is backpropagated to the generator.

3. The video encoder of claim 2, wherein, compression network is trained with a loss function:

$$L_{CD} = E_x[\log D(x)] + E_x[\log(1 - D(C(x)))]$$

subject to $R(C(x)) < R_T$, where $C(x)$ is the output of the compression network, $R(C(x))$ is the rate in bits of the compressed representation, $R_T$ is a rate threshold, and $D(x)$ is the output of the discriminator.

4. The video encoder of claim 1, wherein the unified bitstream comprises:

a stream level header;

a video substream having a video substream header and a video substream payload; and a network update substream having a network update substream header and a network update payload.

5. A video decoder for a machine-video application comprising:

a video decoder receiving an encoded machine-task bitstream representing intermediate feature layer for a machine task and outputting compressed intermediate feature data; and a task network coupled to the video decoder and receiving the compressed intermediate feature data, the task network comprising a pretrained discriminator from a compression-decision generative adversarial model, wherein the task network is trained with intermediate feature data and a generator providing compressed intermediate feature data, the discriminator providing an output loss function of the intermediate feature data and the compressed intermediate feature data that is backpropagated to the generator during training to identify minimally compressed intermediate feature data with similar loss to the discriminator for the machine task as the input signal.

6. The video decoder of claim 5, wherein the task network is trained with a loss function:

$$L_{CD} = E_x[\log D(x)] + E_x[\log(1 - D(C(x)))]$$

subject to $R(C(x)) < R_T$, where $C(x)$ is the output of the compression network, $R(C(x))$ is the rate in bits of the compressed representation, $R_T$ is a rate threshold, and $D(x)$ is the output of the discriminator.

\* \* \* \* \*